United States Patent [19]
Lemieux

[11] Patent Number: 5,954,461
[45] Date of Patent: Sep. 21, 1999

[54] ADJUSTABLE DOWEL PIN HOLE DRILLING GUIDE

[76] Inventor: Raymond A. Lemieux, P.O. Box 697, Claremont, N.H. 03743

[21] Appl. No.: 09/201,275

[22] Filed: Nov. 30, 1998

[51] Int. Cl.[6] .................................................. B23B 39/00
[52] U.S. Cl. ..................................... 408/115 R; 408/73 R
[58] Field of Search .............................. 408/72 R, 115 R, 408/115 B, 103, 97

[56] References Cited

U.S. PATENT DOCUMENTS

| | | |
|---|---|---|
| 2,798,520 | 7/1957 | Maskulka et al. . |
| 4,145,160 | 3/1979 | Wiggins ..................... 408/103 |
| 4,176,989 | 12/1979 | Wolff ....................... 408/115 R |
| 4,492,498 | 1/1985 | Kaufman ..................... 408/115 R |
| 4,579,485 | 4/1986 | Connor et al. ................ 408/92 R |
| 4,583,889 | 4/1986 | Fallon ...................... 408/115 R |
| 4,752,162 | 6/1988 | Groh . |
| 5,775,856 | 7/1998 | Woodard ..................... 408/103 |

Primary Examiner—Andrea L. Pitts
Assistant Examiner—Adesh Bhargava
Attorney, Agent, or Firm—Kevin Elliott, Esq.

[57] ABSTRACT

A dowel pin hole drilling guide for drilling dowel pin guide holes into work pieces, the dowel pin hole drilling guide having a stable piece, the stable piece having adjustable end stop bars rotatably mounted thereto and a movable piece pivotably attached to the stable piece, the movable piece having drill guide passages passing therethrough, the movable piece being adjustable relative to the stable piece and permitting the drilling of dowel pin guide holes in work pieces having compound angled surfaces, the dowel pin drill guide further having stop pin holes passing through the stable piece and stop pins having stop pin heads of various diameters and stop pin stems, the stop pin stems being sized for removable insertion into the stop pin holes and permitting lateral adjustment of the location of dowel pin guide holes to be drilled.

6 Claims, 8 Drawing Sheets

ADJUSTABLE DOWEL PIN HOLE DRILLING GUIDE

CROSS REFERENCE TO OTHER APPLICATIONS

This is the first submission of an application for this article of manufacture. There are no other applications, provisional or non provisional.

FEDERALLY SPONSORED RESEARCH AND DEVELOPMENT

There are no federally sponsored or funded research or development projects or undertakings in any way associated with the instant invention.

BACKGROUND OF THE INVENTION

1. Field of the Invention

The instant invention relates to that field of devices consisting of articles of manufacture known as dowel pin drilling guides. Specifically, the instant invention is an adjustable dowel pin hole drilling guide.

2. Background Information

The prior art known to applicant discloses that dowel pin drilling guides are relatively well known within the art. These drilling guides have ranged from the simple, as embodied in U.S. Pat. No. 2,798,520 issued to J. M. Maskulka on Jul. 9, 1957, to the relatively complex, as embodied in U.S. Pat. No. 4,752,162 issued E. F. Groh on Jul. 21, 1988.

In Maskulka, the primary object of the invention was to create a drill guide which would allow a wood worker to assemble wooden frames without resorting to the traditional mortising of the joints. This was accomplished by creating a device which had an essentially "L" shaped body, the body having two tubular openings, the bore of the tubular openings passing completely through one "leg" of the "L" shaped body. The user of the device would simply lay the wood frame which was to be drilled so that it was cradled by the body, and the tubular openings aligned with the areas of the wood frame which were to be drilled.

This approach worked reasonably well for drilling the flattened ends of wood frames. However, as proposed by Maskulka, it was less than simple to use when drilling the ends of wood frames which were cut on an angle. To drill guide holes on an angled end of a wood frame, the user was forced to carefully measure and locate a center line on both pieces of wood. If the center line was off even slightly on either piece, the two pieces would fit together unevenly, thereby negating the device's intended benefit. While this requirement of a carefully located center line applied even to the flat ended wood frame, Applicant believes it was less likely to cause serious errors as a piece of wood frame work which is composed entirely of 90 degree angles as it is much easier hold in place and measure than is one having more or less steep angles.

A further, and even more serious drawback to the Maskulka device was that it was practically useless when trying to place dowel pins into a wood frame which incorporated compound angles. Applicant has learned that when assembling certain wooden articles, it is necessary to utilize compound angles. For example, if one wished to construct a wooden cone using wood strips, it is necessary to include a compound angle along each side to be joined to another wood strip. The device described in the Maskulka patent cannot be used along such compound angles without a great deal of careful measurement and shimming prior to clamping the device to the wood strip.

Finally, the device described in Maskulka provides for the drilling of guide holes at a pre-determined distance from one another. It is impossible to drill, for example, two holes approximately 3 centimeters apart and also drill another set of holes approximately 5 centimeters apart. The distance between the holes is a function of the distance between the two tubes, and no variability is therefore possible.

Other prior art has attempted to deal with the problem of variability of distance between holes. For example, in Groh, the drilling of holes at varying distances is accomplished by the inclusion of two bodies nearly identical to that disclosed in Maskulka. However, in Groh, these two bodies are connected to one another via a rod passing through each body that permits the distance between the two bodies to be varied.

Unfortunately, Groh suffers from the same shortcoming as does Maskulka; it cannot easily be used when drilling guide holes into material having compound angles. Furthermore, when used to drill holes at the end of a plank of wood (or other material), Groh is unwieldy, and works best when its inventive feature (the rod permitting adjustability) is removed. When used in this fashion, the Groh device is simply another version of the Maskulka device, and fails to perform certain tasks in the same fashion as does the Maskulka device.

SUMMARY OF THE INVENTION

The instant invention is an adjustable dowel pin hole drilling guide capable of functioning equally well at various locations along a wooden plank, or similar article. Furthermore, the instant invention may be used with relative ease even on those articles which incorporate compound angles, a feature found nowhere in the prior art.

A first object of the instant invention is to provide a drilling guide useful for preparing articles for the insertion of dowel pins. This object is accomplished through the use of a two piece body which has a series of holes passing therethrough. The holes are of a diameter specially adapted to accommodate drill bits commonly used for drilling dowel pin holes.

A second object of the invention is to provide means which ensure that articles to be co-joined by dowel pins are aligned properly prior to drilling. This is accomplished by the inclusion of end stop bars rotatably attached to the body. An article to be drilled may be set onto the body such that both pieces of the body are in direct contact with the article, while the article is pressed against an end stop bar, thereby ensuring repeatedly consistent placement of the guide holes.

A third object of the invention is to permit the drilling of dowel pin holes into articles which incorporate compound angles. This is accomplished by pivotably attaching the two pieces of the body together such that the two pieces may be adjusted relative to one another. This permits drilling of dowel pin guide holes into the article, at any angle between 44 degrees and 90 degrees.

A fourth object of the invention is to permit the drilling of dowel pin guide holes into articles having varying thicknesses, whether compound angles are involved or not. This is accomplished by providing the two pieces of the body with multiple attachment points so that the dowel pin guide holes can be drilled along different horizontal planes.

A final objective of the instant invention is to provide a wider range of choices when locating the dowel pin guide holes and allow the user to vary the distances between the holes. This is accomplished in a second embodiment of the instant invention wherein stop pin holes are located at various points on the surface of the invention and stop pins having varying stop pin head diameters may be inserted into these stop pin holes, thereby providing for lateral offsetting of the dowel pin drill guide holes.

It will also be recognized that whether a butt joint, a corner joint (such as a 45 degree corner) or a compound angle joint is to be created, use of the instant invention ensures that the mated edges of the work piece to be joined will be flush with one another, thus reducing the time required to file and sand the adjoining edges in order to create flush surfaces along the joint.

A DESCRIPTION OF THE DRAWINGS

A DESCRIPTION OF THE PREFERRED EMBODIMENT

Figure 1:
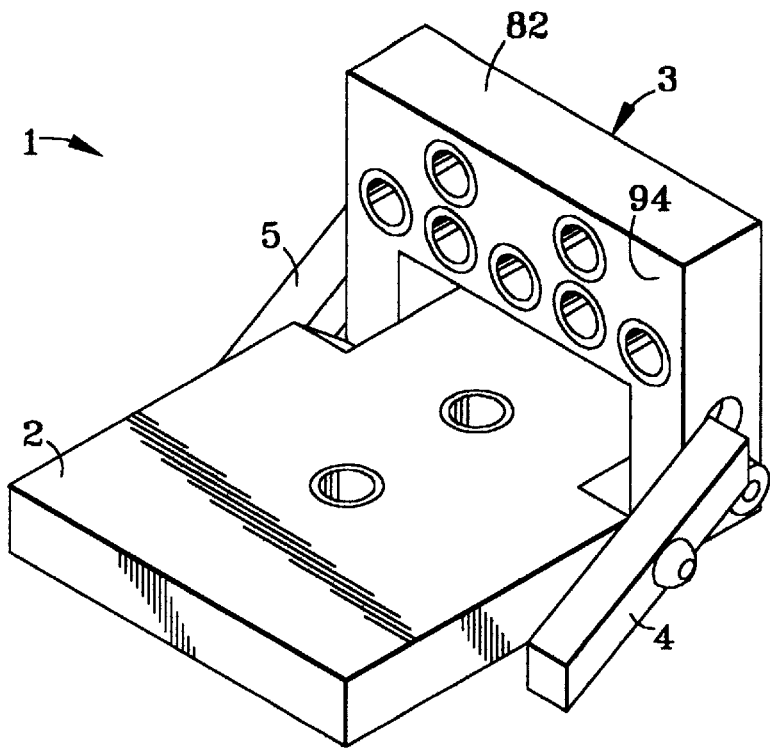
FIG. 1 is a perspective view of the completed device.

As per FIG. 1, the instant invention is body (1) constructed of a stable piece (2) and a movable piece (3), the movable piece being pivotably attached to the stable piece. The body further has first rotatable end stop bar (4) and a second rotatable end stop bar (5), the first rotatable end stop bar and the second rotatable end stop bar being rotatably attached to the stable piece (2).

Figure 2:
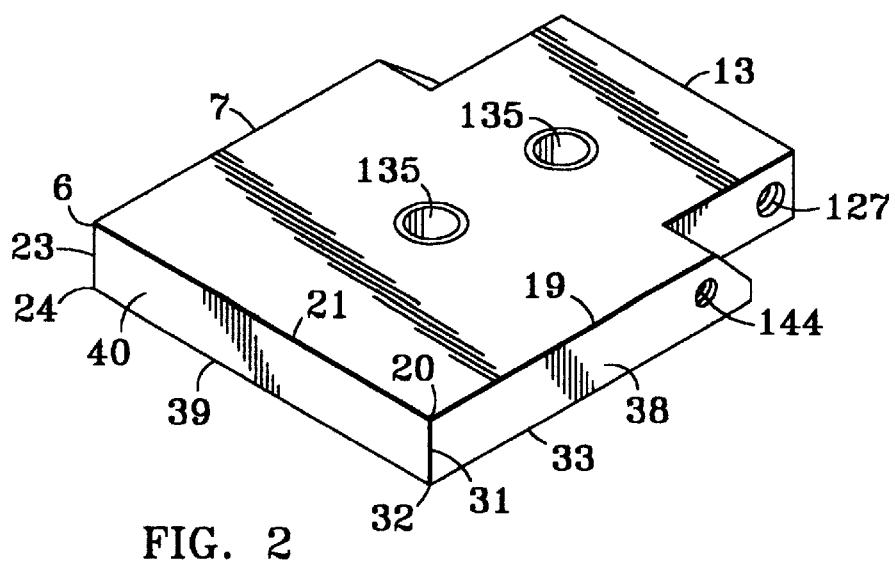
FIG. 2 is a perspective view of the stable piece of the instant invention.
Figure 5:
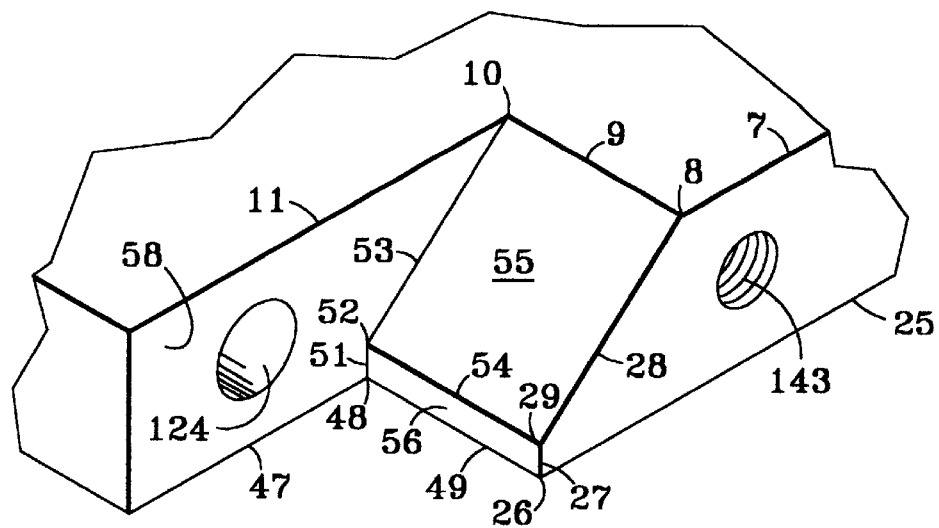
FIG. 5 is a perspective view of a portion of the instant invention including the first angled surface.

As per FIGS. 2 and 5, the stable piece (2) may be better understood with reference to a first point (6). A first edge (7) extends away from the first point (6) in the form of a straight line to a second point (8), the first edge (7) meeting and merging into a second edge (9) at the second point (8). In the preferred embodiment, the first edge (7) has a length of approximately 2 and ¾ inches.

The second edge (9) extends away from the second point (8) in the form of a straight line, meeting and merging into a third edge (11) at a third point (10). The first edge (7) and the second edge (9) are at a right angle relative to one another, and co-planar with one another.

Figure 3:
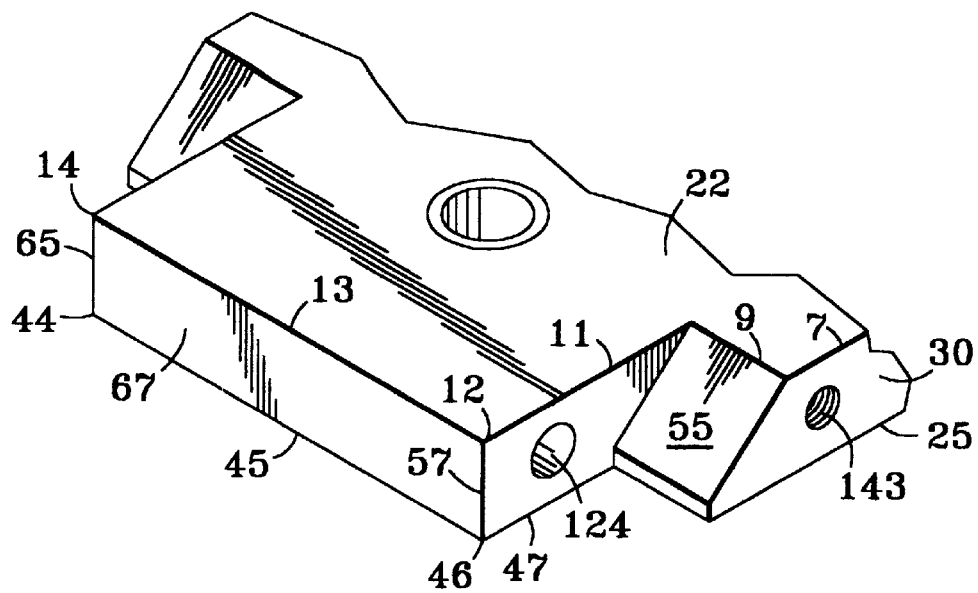
FIG. 3 is a perspective view of a portion of the instant invention including the first angled surface.

As per FIGS. 3 and 5, the third edge (11) extends away from the third point (10) in the form of a straight line, meeting and merging into a fourth edge (13) at a fourth point (12). The second edge (9) and the third edge (11) are at a right angle relative to one another, and are co-planar with one another. Furthermore, the third edge (11) is parallel to and co-planar with the first edge (7).

Figure 7:
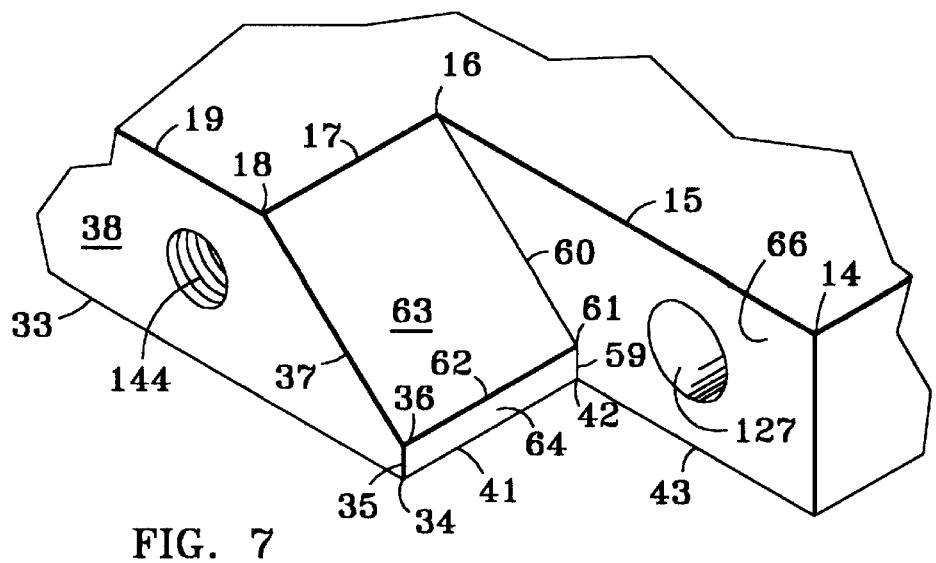
FIG. 7 is a close up perspective of a portion of the instant invention including the second angled surface.

As per FIGS. 3 and 7, the fourth edge (13) then extends away from the fourth point (12) in the form of a straight line, meeting and merging into a fifth edge (15) at a fifth point (14). The fourth edge (13) and the third edge (11) are at a right angle relative to one another, and are co-planar with one another. Furthermore, the fourth edge (13) is parallel to and co-planar with the second edge (9).

The fifth edge (15) then extends away from the fifth point (14) in the form of a straight line, meeting and merging into a sixth edge (17) at a sixth point (16). The fifth edge (15) and the fourth edge (13) are at a right angle relative to one another, and are co-planar with one another. Furthermore, the fifth edge (15) is parallel to and co-planar with the third edge (11).

The sixth edge (17) then extends away from the sixth point (16) in the form of a straight line, meeting and merging into a seventh edge (19) at a seventh point (18). The sixth edge (17) and the fifth edge (15) are at a right angle relative to one another, and are co-planar with one another. Furthermore, the sixth edge (17) is parallel to and co-planar with the fourth edge (13).

As per FIGS. 2 and 7, the seventh edge (19) then extends away from the seventh point (18) in the form of a straight line, meeting and merging into an eighth edge (21) at an eighth point (20). The seventh edge (19) and the sixth edge (17) are at a right angle relative to one another, and are co-planar with one another. Furthermore, the seventh edge (19) is parallel to and co-planar with the fifth edge (15).

The eighth edge (21) then extends away from the eighth point (20) in the form of a straight line, meeting and merging into the first edge (7) at the first point (6). The eighth edge (21) and the seventh edge (19) are at a right angle relative to one another, and are co-planar with one another. Furthermore, the eighth edge (21) is parallel to and co-planar with the fourth edge (13).

It should be readily understood that the first edge (7), the third edge (11), the fifth edge (15) and the seventh edge (19) are all parallel to and co-planar with, one another. Furthermore, the eighth edge (21), the second edge (9), the sixth edge (17) and the fourth edge (13) are all parallel to and co-planar with one another. Furthermore, when the second edge (9) extends away from the second point (8), it extends towards the sixth point (16). When the sixth edge (17) extends away from the sixth point (16) it also extends away from the third point (10).

As per FIGS. 2, 3 and 7, the first edge (7), the second edge (9), the third edge (11), the fourth edge (13), the fifth edge (15) the sixth edge (17) the eighth edge (19) and the ninth edge (21) together form the periphery of a first top surface (22). The first top surface (22) is co-planar with the first edge (7), the second edge (9), the third edge (11), the fourth edge (13), the fifth edge (15) the sixth edge (17) the eighth edge (19) and the ninth edge (21). In the preferred embodiment, the second edge (9) has a length of approximately ½ of one inch, the third edge (11) has a length of approximately one and ¼ inches, the ninth edge (21) has a length of approximately 3 and ¼ inches and the fourth edge (13) has a length of approximately 2 and ¼ inches.

As per FIG. 2, the instant invention further has a tenth edge (23) extending downwardly, in the form of a straight line, away from the first point (6), meeting and merging into an eleventh edge (25) at a ninth point (24). The tenth edge (23) is perpendicular to the first edge (7) and the first top surface (22). In the preferred embodiment, the tenth edge (23) has a height of approximately ½ of one inch.

As per FIGS. 3 and 5, the eleventh edge (25) then extends away from the ninth point (24) in the form of a straight line, meeting and merging into an twelfth edge (27) at a tenth point (26). The eleventh edge (25) and the tenth edge (23) are at a right angle relative to one another, and are co-planar with one another. Furthermore, the eleventh edge (25) is parallel to and co-planar with the first edge (7).

The twelfth edge (27) then extends upwardly, away from the tenth point (26) in the form of a straight line, meeting and merging into an thirteenth edge (28) at an eleventh point (29). The twelfth edge (27) and the eleventh edge (25) are at a right angle relative to one another, and are co-planar with one another. Furthermore, the twelfth edge (27) is perpendicular to and co-planar with the first edge (7).

The thirteenth edge (28) then extends away from the eleventh point (29), at an acute angle relative to the eleventh edge (25) in the form of a straight line, meeting and merging into the first edge (7) at the second point (8). The thirteenth edge (28) is coplanar with the first edge (7).

As per FIGS. 2, 3, and 5, it should be readily understood that the tenth edge (23), the eleventh edge (25), the twelfth edge (27), the thirteenth edge (28), and the first edge (7) together form the periphery of a first side surface (30). The first side surface (30) is co-planar with the tenth edge (23), the eleventh edge (25), the twelfth edge (27), the thirteenth edge (28), and the first edge (7). Furthermore, the first side surface (30) is perpendicular relative to the first top surface (22), the top surface and the first side surface sharing a peripheral edge, namely, the first edge (7).

As per FIGS. 2 and 7, the instant invention further has a fourteenth edge (31) extending downwardly, in the form of a straight line, away from the eighth point (20), meeting and merging into a fifteenth edge (33) at a twelfth point (32). The fourteenth edge (31) is perpendicular to the first edge (7) and the first top surface (22), and parallel to and co-planar with, the tenth edge (23).

The fifteenth edge (33) then extends away from the twelfth point (32) in the form of a straight line, meeting and merging into an sixteenth edge (35) at a thirteenth point (34). The fifteenth edge (33) and the fourteenth edge (31) are at a right angle relative to one another, and are co-planar with one another. Furthermore, the fifteenth edge (33) is parallel to and co-planar with the seventh edge (19).

The sixteenth edge (35) then extends upwardly, away from the thirteenth point (34) in the form of a straight line, meeting and merging into an seventeenth edge (37) at an fourteenth point (36). The sixteenth edge (35) and the fifteenth edge (33) are at a right angle relative to one another, and are co-planar with one another. Furthermore, the sixteenth edge (27) is perpendicular to and co-planar with the seventh edge (19).

The seventeenth edge (37) then extends away from the fourteenth point (36), at an acute angle relative to the fifteenth edge (33) in the form of a straight line, meeting and merging into the seventh edge (19) at the seventh point (18). The seventeenth edge (37) is co-planar with the seventh edge (7) and the fifteenth edge (33).

As per FIGS. 2 and 7, it should be readily understood that the fourteenth edge (31), the fifteenth edge (33), the sixteenth edge (35), the seventeenth edge (37), and the seventh edge (19) together form the periphery of a second side surface (38). The second side surface (38) is co-planar with the fourteenth edge (31), the fifteenth edge (33), the sixteenth edge (35), the seventeenth edge (37), and the seventh edge (19). Furthermore, the second side surface (38) is perpendicular relative to the first top surface (22), the top surface and the first side surface sharing a peripheral edge, namely, the seventh edge (19). Additionally, the first side surface (30) and the second side surface (38) are parallel, though not co-planar.

As per FIG. 2, the instant invention further has an eighteenth edge (39) extending in the form of a straight line, away from the twelfth point (32), meeting and merging into the ninth point (24). The eighteenth edge (39) is perpendicular to the tenth edge (23), the first side surface (30), and the second side surface (38), and is parallel to and co-planar with, the eighth edge (21).

As per FIG. 2, it should be readily understood that the eighth edge (21), the tenth edge (23), the eighteenth edge (39), and the fourteenth edge (31) together form the periphery of a third side surface (40). The third side surface (40) is co-planar with the eighth edge (21), the tenth edge (23), the eighteenth edge (39), and the fourteenth edge (31). Furthermore, the third side surface (40) is perpendicular relative to the first top surface (22), the top surface and the third side surface sharing a peripheral edge, namely, the eighth edge (21). Additionally, the third side surface (40) and the second side surface (38) are perpendicular to one another.

Figure 4:
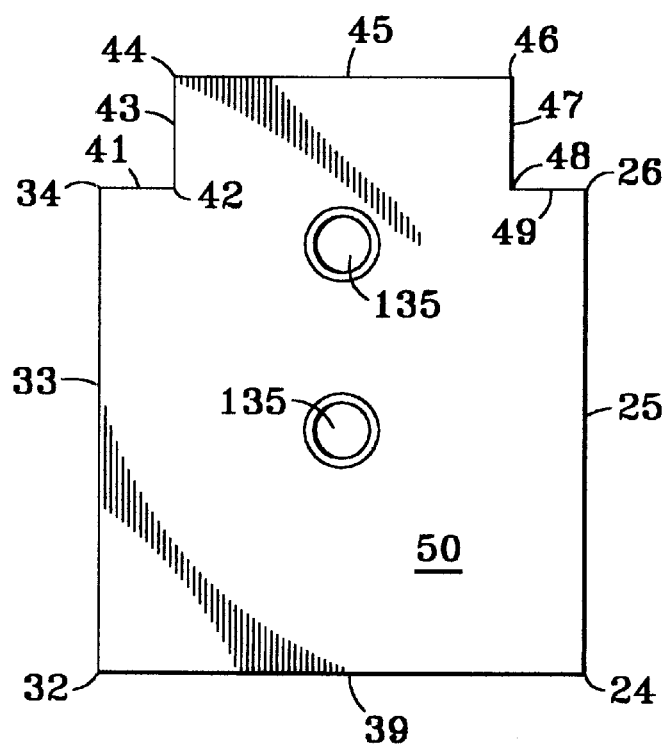
FIG. 4 is a plan view of the bottom of the stable piece of the instant invention.

As per FIG. 4, the instant invention further has a nineteenth edge (41) extending away from the thirteenth point (34) in the form of a straight line, meeting and merging into a twentieth edge (43) at a. The nineteenth edge (41) and the fifteenth edge (33) are at a right angle relative to one another, and co-planar with one another.

The twentieth edge (43) extends away from the thirty third point (42) in the form of a straight line, meeting and merging into a twenty first edge (45) at a fifteenth point (44). The twentieth edge (43) and the nineteenth edge (41) are at a right angle relative to one another, and are co-planar with one another. Furthermore, the twentieth edge (43) is parallel to and co-planar with the fifteenth edge (33).

The twenty first edge (45) then extends away from the fifteenth point (44) in the form of a straight line, meeting and merging into a twenty second edge (47) at a sixteenth point (46). The twenty first edge (45) and the twentieth edge (43) are at a right angle relative to one another, and are co-planar with one another. Furthermore, the twenty first edge (45) is parallel to and co-planar with the eighteenth edge (39).

The twenty second edge (47) then extends away from the sixteenth point (46) in the form of a straight line, meeting and merging into a twenty third edge (49) at a seventeenth point (48). The twenty second edge (47) and the twenty first edge (45) are at a right angle relative to one another, and are co-planar with one another. Furthermore, the twenty second edge (47) is parallel to and co-planar with the twentieth edge (43).

The twenty third edge (49) then extends away from the seventeenth point (48) in the form of a straight line, meeting and merging into the eleventh edge (25) at the tenth point (26). The twenty third edge (49) and the eleventh edge (25) are at a right angle relative to one another, and are co-planar with one another. Furthermore, the twenty third edge (49) is parallel to and co-planar with the eighteenth edge (39) and the nineteenth edge (41).

It should be readily understood that the fifteenth edge (33), the nineteenth edge (41), the twentieth edge (43), the twenty first edge (45), the twenty second edge (47), the twenty third edge (49), the eleventh edge (25) and the eighteenth edge (39) together form the periphery of a first bottom surface (50). The first bottom surface (50) is co-planar with the fifteenth edge (33), the nineteenth edge (41), the twentieth edge (43), the twenty first edge (45), the twenty second edge (47), the twenty third edge (49), the eleventh edge (25), and the eighteenth edge (39). Furthermore, the bottom (50) is perpendicular relative to the first side surface (30) and the second side surface (38). The first bottom surface (50) and the first side surface (30) sharing a peripheral edge, namely, the eleventh edge (25). The first bottom surface (50) and the second side surface (38) sharing a peripheral edge, namely, the fifteenth edge (33). The first bottom surface (50) and the third side surface (40) sharing a peripheral edge, namely, the eighteenth edge (39). Additionally, the first bottom surface (50) and the first top surface (22) are parallel, though not co-planar.

As per FIG. 5, the instant invention further has a twenty fourth edge (51) extending in the form of a straight line, away from the seventeenth point (48) and merging and meeting into a twenty fifth edge (53) at an eighteenth point (52). The twenty fourth edge (51) is perpendicular to and co-planar with, the twenty third edge (49).

The twenty fifth edge (53) extends away from the eighteenth point (52), at an acute angle, parallel to and co-planar with the thirteenth edge (28). The twenty fifth edge (53) then meets and merges into the second edge (9) and the third edge (11) at the third point (10).

Figure 6:
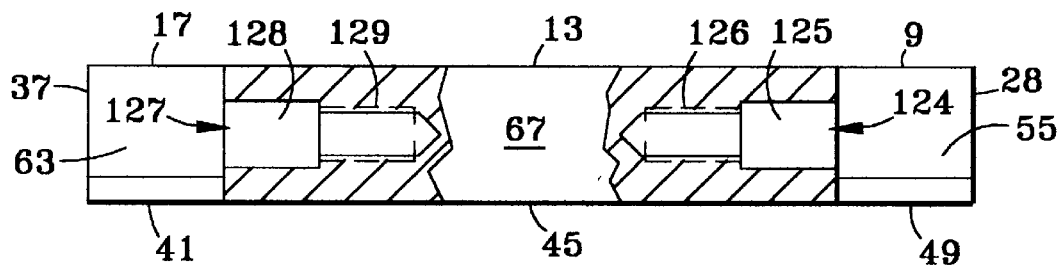
FIG. 6 is a partially cutaway elevational view of the end of the stable piece of the instant invention.

As per FIGS. 5 and 6, the instant invention further has a twenty sixth edge (54). The twenty sixth edge (54) extends in the form of a straight line, away from the eighteenth point (52), meeting and merging into the thirteenth edge (28) and the twelfth edge (27) at the eleventh point (29). The twenty sixth edge (54) is parallel to and co-planar with the twenty third edge (49).

It should be readily understood that the second edge (9), the thirteenth edge (28), the twenty sixth edge (54), and the twenty fifth edge (53) together form the periphery of a first inclined surface (55) The first inclined surface (55) is at an angle relative to both the first top surface (22) and the first bottom surface (50). Furthermore, the angle of the first inclined surface (55) relative to the first bottom surface (50) is equal to the angle of both the twenty fifth edge (53) and the thirteenth edge (28). In the preferred embodiment, the thirteenth edge (28) has a length of ⅝ of one inch.

It should also be understood that the first inclined surface (55) and the first side surface (30) share a peripheral edge, namely, the thirteenth edge (28). The first inclined surface (55) and the first top surface (22) share a peripheral edge, namely, the second edge (9).

As per FIGS. 3 and 5, the instant invention further has a fourth side surface (56). The twenty sixth edge (54), the twelfth edge (27), the twenty third edge (49), and the twenty fourth edge (51) together form the periphery of the fourth side surface (56). The fourth side surface being parallel to, though not co-planar with the third side surface (40) and the second edge (9).

It should also be understood that the fourth side surface (56) and the first side surface (30) share a peripheral edge, namely, the twelfth edge (27). The fourth side surface (56) and the first inclined surface (55) share a peripheral edge, namely, the twenty sixth edge (54). Furthermore, the fourth side surface (56) and the first bottom surface (50) share a peripheral edge, namely, the twenty third edge (49).

The instant invention further has a twenty seventh edge (57). The twenty seventh edge (57) extends in the form of a straight line, away from the sixteenth point (46), meeting and merging into the third edge (11) and the fourth edge (13) at the fourth point (12). The twenty seventh edge (57) is perpendicular to and co-planar with the fourth edge (13).

It should be readily understood that the twenty seventh edge (57), the third edge (11), the twenty fifth edge (53), the twenty fourth edge (51), and the twenty second edge (47) together form the periphery of a fifth side surface (58). The fifth side surface (58) is parallel to, though not co-planar with the first side surface (30) and the second side surface (38). In the preferred embodiment, the twenty fourth edge (51) has a height of approximately ¹⁄₁₆ of one inch.

It should also be understood that the fifth side surface (58) and the first inclined surface (55) share a peripheral edge, namely, the twenty fifth edge (53). The fifth side surface (58) and the first top surface (22) share a peripheral edge, namely, the third edge (11). The fifth side surface (58) and the first bottom surface (50) share a peripheral edge, namely, the twenty second edge (47). The fifth side surface and the fourth side surface (56) share a peripheral edge, namely, the twenty fourth edge (51). In the preferred embodiment, the twenty second edge (47) has a length of approximately ¾ of one inch.

As per FIGS. 2, 4, 6, and 7, the instant invention further has a twenty eighth edge (59) extending in the form of a straight line, away from the thirty third point (42) and merging and meeting into a twenty ninth edge (60) at an nineteenth point (61). The twenty eighth edge (59) is perpendicular to and co-planar with, the nineteenth edge (41).

The twenty ninth edge (60) extends away from the nineteenth point (61), at an acute angle, parallel to and co-planar with the seventeenth edge (37). The twenty ninth edge (60) then meets and merges into the sixth edge (17) and the fifth edge (15) at the sixth point (16).

The instant invention further has a thirtieth edge (62). The thirtieth edge (62) extends in the form of a straight line, away from the nineteenth point (61), meeting and merging into the seventeenth edge (37) and the sixteenth edge (35) at the fourteenth point (36). The thirtieth edge (62) is parallel to and co-planar with the nineteenth edge (41).

It should be readily understood that the sixth edge (17), the seventeenth edge (37), the thirtieth edge (62), and the twenty ninth edge (60) together form the periphery of a second inclined surface (63). The second inclined surface (63) is at an acute angle relative to both the first top surface (22) and the first bottom surface (50). Furthermore, the angle of the second inclined surface (63) relative to the first bottom surface (50) is equal to the angle of the twenty ninth edge (60), the seventeenth edge (37) and the thirteenth edge (28).

It should also be understood that the second inclined surface (63) and the second side surface (38) share a peripheral edge, namely, the seventeenth edge (37). The second inclined surface (63) and the first top surface (22) share a peripheral edge, namely, the sixth edge (17).

As per FIG. 7, the instant invention further has a sixth side surface (64). The thirtieth edge (62), the sixteenth edge (35), the nineteenth edge (41), and the twenty eighth edge (59)

together form the periphery of the sixth side surface (64). The sixth side surface being parallel to, though not co-planar with the third side surface (40) and the sixth edge (17).

It should also be understood that the sixth side surface (64) and the second side surface (38) share a peripheral edge, namely, the sixteenth edge (35). The sixth side surface (64) and the second inclined surface (63) share a peripheral edge, namely, the thirtieth edge (62). Furthermore, the sixth side surface (64) and the first bottom surface (50) share a peripheral edge, namely, the nineteenth edge (41).

The instant invention further has a thirty first edge (65). The thirty first edge (65) extends in the form of a straight line, away from the fifteenth point (44), meeting and merging into the fifth edge (15) and the fourth edge (13) at the fifth point (14). The thirty first edge (65) is perpendicular to and co-planar with the fourth edge (13).

It should be readily understood that the thirty first edge (65), the fifth edge (15), the twenty ninth edge (60), the twenty eighth edge (59), and the twentieth edge (43) together form the periphery of a seventh side surface (66). The seventh side surface (66) is parallel to, though not co-planar with the first side surface (30) and the second side surface (38).

It should also be understood that the seventh side surface (66) and the second inclined surface (63) share a peripheral edge, namely, the twenty ninth edge (60). The seventh side surface (66) and the first top surface (22) share a peripheral edge, namely, the fifth edge (15). The seventh side surface (66) and the first bottom surface (50) share a peripheral edge, namely, the twentieth edge (43). The seventh side surface and the sixth side surface (64) share a peripheral edge, namely, the twenty eighth edge (59).

As per FIGS. 3, 6, and 7, the instant invention further has an eighth side surface (67). The thirty first edge (65), the fourth edge (13), the twenty seventh edge (57), and the twenty first edge (45) together form the periphery of the eighth side surface (67). The sixth side surface being parallel to, though not co-planar with the third side surface (40), the sixth side surface (64) and the fourth side surface (56).

It should also be understood that the eighth side surface (67) and the seventh side surface (66) share a peripheral edge, namely, the thirty first edge (65). The eighth side surface (67) and the first top surface (22) share a peripheral edge, namely, the fourth edge (13). The eighth side surface (67) and the fifth side surface (58) share a peripheral edge, namely, the twenty seventh edge (57). The eighth side surface and the first bottom surface (50) share a peripheral edge, namely, the twenty first edge (45). Furthermore, the eighth side surface is perpendicular to the first top surface (22) and the seventh side surface (66).

It should be noted that in the preferred embodiment, the eighth edge (21) and the eighteenth edge (39) have the same length. The first edge (7) and the seventh edge (19) have the same length. The third edge (11) and the fifth edge (15) have the same length. The thirteenth edge (28), the twenty fifth edge (53), the seventeenth edge (37) and the twenty ninth edge (60) all have the same length.

Furthermore, the tenth edge (23), the fourteenth edge (31) the twenty seventh edge (57) and the thirty first edge (65) all have the same height. The twenty fourth edge (51), the twelfth edge (27), the sixteenth edge (35) and the twenty eighth edge (59) all have the same height. The twenty sixth edge (54), the second edge (9), the twenty third edge (49), the nineteenth edge (41), the thirtieth edge (62) and the sixth edge (17) all have the same length. The twenty second edge (47) and the twentieth edge (43) have the same length. The fourth edge (13) and the twenty first edge (45) have the same length. Finally, the fifteenth edge (33) and the eleventh edge (25) have the same length.

Having described the stable piece (2) by reference to the surfaces which compose said section, it should now be clear that the stable piece is essentially a rectangularly shaped solid block having a rectangular protrusion flanked by a pair of inclined planes. In the preferred embodiment, the stable piece is constructed from a single block of aircraft grade aluminum, or other similar strong, relatively lightweight and non-flexible material, which is then machined to produce the desired surfaces.

As per FIGS. 1, 8, 9 and 10, the movable piece (3) may be better understood with reference to a twentieth point (68). A thirty second edge (69) extends away from the twentieth point (68) in the form of a straight line to a twenty first point (70), the thirty second edge (69) meeting and merging into a thirty third edge (71) at the twenty first point (70).

The thirty third edge (71) then extends away from the twenty first point (70) in the form of a straight line, meeting and merging into a thirty fourth edge (72) at a twenty second point (73). The thirty third edge (71) and the thirty second edge (69) are at a right angle relative to one another, and are co-planar with one another.

The thirty fourth edge (72) then extends away from the twenty second point (73) in the form of a straight line, meeting and merging into a thirty fifth edge (74) at a twenty third point (75). The thirty fourth edge (72) and the thirty third edge (71) are at a right angle relative to one another, and are co-planar with one another. Furthermore, the thirty fourth edge (72) is parallel to and co-planar with the thirty second edge (69).

The thirty fifth edge (74) then extends away from the twenty third point (75) in the form of a straight line, meeting and merging into the thirty second edge (74) at a twentieth point (68). The thirty fifth edge (74) and the thirty fourth edge (72) are at a right angle relative to one another, and are co-planar with one another. Furthermore, the thirty fifth edge (74) is parallel to and co-planar with the thirty third edge (71).

It should be readily understood that the thirty second edge (69), the thirty third edge (71), the thirty fourth edge (72), and the thirty fifth edge (74) together form the periphery of a ninth side surface (76).

Figure 8:
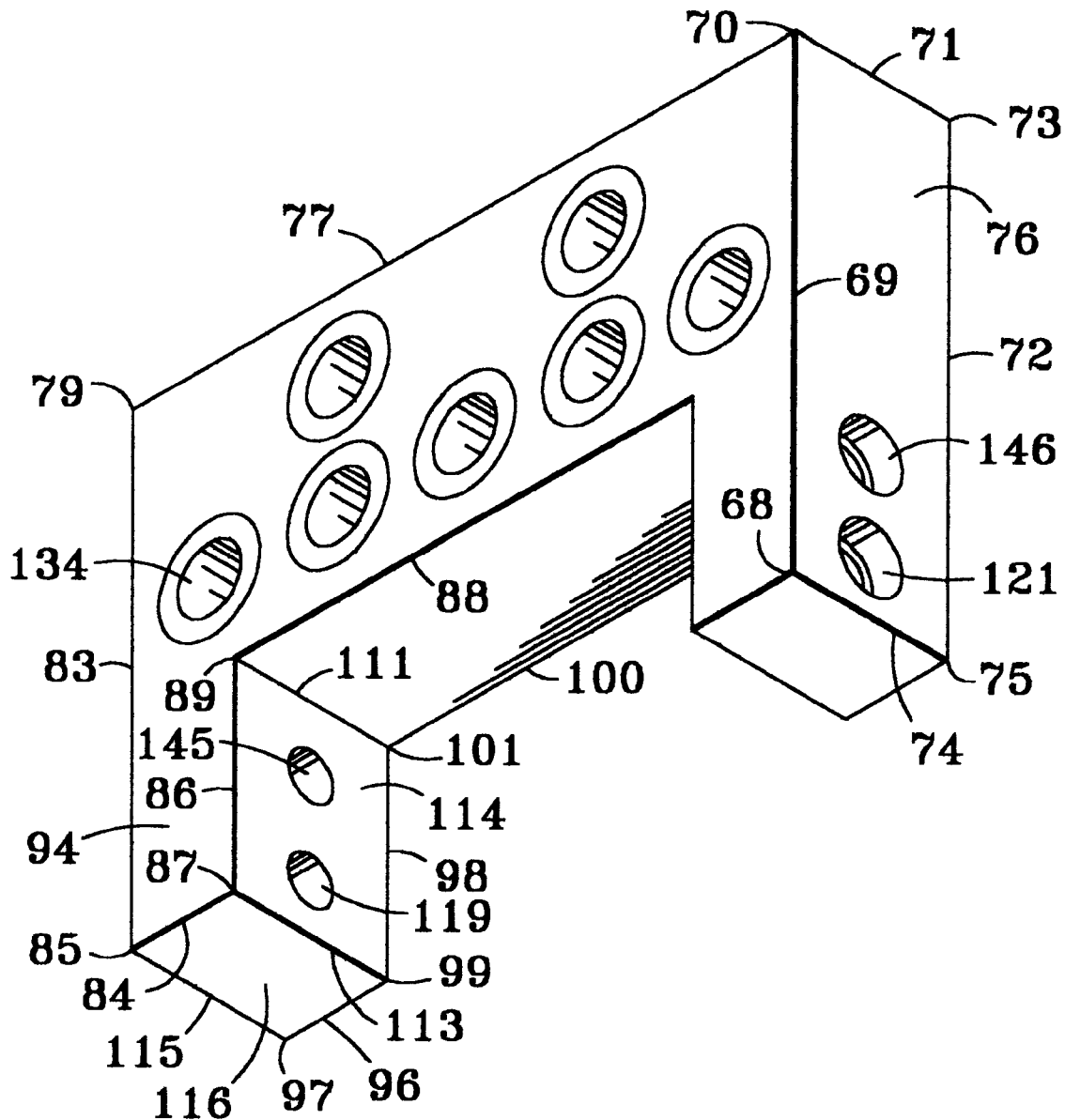
FIG. 8 is a perspective view of the movable piece of the instant invention.
Figure 9:
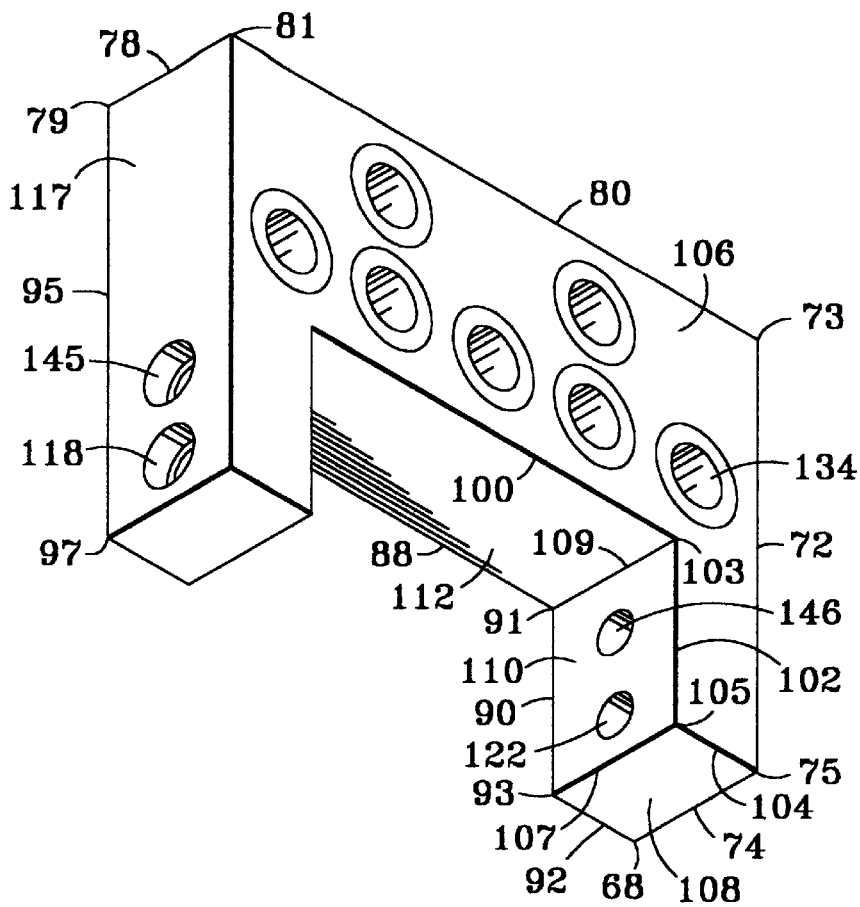
FIG. 9 is a perspective view of the movable piece of the instant invention.

As per FIGS. 8 and 9, a thirty sixth edge (77) extends away from the twenty first point (70) in the form of a straight line to a thirty fourth point (79), the thirty sixth edge (77) meeting and merging into a thirty seventh edge (78) at the thirty fourth point (79). The thirty sixth edge (77) being at a right angle to, and co-planar with, the thirty third edge (71) and at a right angle, though not co-planar with, the thirty second edge (69).

The thirty seventh edge (78) then extends away from the thirty fourth point (79) in the form of a straight line, meeting and merging into a thirty eighth edge (80) at a thirty fifth point (81). The thirty seventh edge (78) and the thirty sixth edge (77) are at a right angle relative to one another, and are co-planar with one another. Furthermore, the thirty seventh edge (78) is parallel to and co-planar with the thirty third edge (71).

The thirty ninth edge (80) then extends away from the thirty fifth point (81) in the form of a straight line, meeting and merging into the thirty third edge (71) at the twenty second point (73). The thirty ninth edge (80) and the thirty seventh edge (78) are at a right angle relative to one another, and are co-planar with one another. Furthermore, the thirty ninth edge (80) is parallel to and co-planar with the thirty sixth edge (77).

It should be readily understood that the thirty third edge (71), the thirty sixth edge (77), the thirty seventh edge (78), and the thirty ninth edge (80) together form the periphery of a second top surface (82). The second top surface (82) and the ninth side surface (76) share a peripheral edge, namely, the thirty third edge (71). Furthermore, the second top surface (82) is at a right angle to the ninth side surface (76).

The instant invention further has a fortieth edge (83) extending downwardly, in the form of a straight line, away from the thirty fourth point (79), meeting and merging into a forty first edge (84) at a twenty fourth point (85). The fortieth edge (83) is perpendicular to the thirty sixth edge (77) and the thirty seventh edge (78), and parallel to and co-planar with, the thirty second edge (69).

The forty first edge (84) then extends away from the twenty fourth point (85) in the form of a straight line, meeting and merging into a forty second edge (86) at a twenty fifth point (87). The forty first edge (84) and the fortieth edge (83) are at a right angle relative to one another, and are co-planar with one another. Furthermore, the forty first edge (84) is parallel to and co-planar with the thirty sixth edge (77).

The forty second edge (86) then extends upwardly, away from the twenty fifth point (87) in the form of a straight line, meeting and merging into a forty third edge (88) at a twenty sixth point (89). The forty second edge (86) and the forty first edge (84) are at a right angle relative to one another, and are co-planar with one another. Furthermore, the forty second edge (86) is parallel to and co-planar with the fortieth edge (83).

The forty third edge (88) then extends away from the twenty sixth point (89) in the form of a straight line, meeting and merging into a forty fourth edge (90) at a twenty seventh point (91). The forty third edge (88) and the forty second edge (86) are at a right angle relative to one another, and are co-planar with one another. Furthermore, the forty third edge (88) is parallel to and co-planar with the forty first edge (84).

The forty fourth edge (90) then extends downwardly, away from the twenty seventh point (91) in the form of a straight line, meeting and merging into a forty fifth edge (92) at a thirty sixth point (93). The forty fourth edge (90) and the forty third edge (88) are at a right angle relative to one another, and are co-planar with one another. Furthermore, the forty fourth edge (90) is parallel to and co-planar with the forty second edge (86).

The forty fifth edge (92) then extends away from the thirty sixth point (93) in the form of a straight line, meeting and merging into the thirty fifth edge (74) and the edge thirty second edge (69) at the twentieth point (68). The forty fifth edge (86) is at a right angle to the thirty second edge (69) and the forty fourth edge (90), is co-planar with both the thirty second edge (69) and the forty fourth edge (90). Furthermore, the forty fifth edge (92) is parallel to and co-planar with the forty third edge (88).

It should be readily understood that the thirty sixth edge (77), the fortieth edge (83), the forty first edge (84), the forty second edge (86), the forty third edge (88), the forty fourth edge (90), the forty fifth edge (92), and the thirty second edge (69) together form the periphery of a tenth side surface (94). The tenth side surface (94) and the second top surface (82) share a peripheral edge, namely, the thirty sixth edge (77). The tenth side surface (94) and the ninth side surface (76) share a peripheral edge, namely, the thirty second edge (69). Furthermore, the tenth side surface (94) is at a right angle to the ninth side surface (76) and the second top surface (82).

The instant invention further has a forty sixth edge (95) extending downwardly in the form of a straight line, away from the thirty fifth point (81), meeting and merging into a forty seventh edge (96) at a twenty eighth point (97). The forty sixth edge (95) is perpendicular to and co-planar with, the thirty ninth edge (80), and parallel to the fortieth edge (83).

The forty seventh edge (96) then extends away from the twenty eighth point (97) in the form of a straight line toward the twenty third point (75), meeting and merging into a forty eighth edge (98) at a twenty ninth point (99). The forty seventh edge (96) and the forty sixth edge (95) are at a right angle relative to one another, and are co-planar with one another.

The forty eighth edge (98) then extends away from the twenty ninth point (99), toward the thirty ninth edge (80) in the form of a straight line, meeting and merging into a forty ninth edge (100) at a thirtieth point (101). The forty eighth edge (98) and the forty seventh edge (96) are at a right angle relative to one another, and are co-planar with one another. Furthermore, the forty eighth edge (98) is parallel to and co-planar with the forty sixth edge (95).

The forty ninth edge (100) then extends away from the thirtieth point (101) in the form of a straight line, meeting and merging into a fiftieth edge (102) at a thirty first point (103). The forty ninth edge (100) and the forty eighth edge (98) are at a right angle relative to one another, and are co-planar with one another. Furthermore, the forty ninth edge (100) is parallel to and co-planar with the thirty ninth edge (80).

The fiftieth edge (102) then extends away from the thirty first point (103) in the form of a straight line, meeting and merging into a fifty first edge (104) at a thirty second point (105). The fiftieth edge (102) and the forty ninth edge (100) are at a right angle relative to one another, and are co-planar with one another. Furthermore, the fiftieth edge (102) is parallel to and co-planar with the forty eighth edge (98).

The fifty first edge (104) then extends away from the thirty second point (105) in the form of a straight line, meeting and merging into the edge (72) at the twenty third point (75). The fifty first edge (104) and the fiftieth edge (102) are at a right angle relative to one another, and are co-planar with one another. Furthermore, the fifty first edge (104) is parallel to and co-planar with the forty ninth edge (100).

It should be readily understood that the thirty ninth edge (80), the forty sixth edge (95), the forty seventh edge (96), the forty eighth edge (98), the forty ninth edge (100), the fiftieth edge (102), the fifty first edge (104), and the thirty fourth edge (72) together form the periphery of an eleventh side surface (106). The eleventh side surface (106) and the second top surface (82) share a peripheral edge, namely, the thirty ninth edge (80). The eleventh side surface (106) and the ninth side surface (76) share a peripheral edge, namely, the thirty fourth edge (72). Furthermore, the eleventh side surface (106) is at a right angle to the ninth side surface (76) and the second top surface (82).

As per FIG. 9, the instant invention further has a fifty second edge (107) extending away from the thirty second point (105) to the thirty sixth point (93). The fifty second edge (107) is perpendicular to, and co-planar with, both the fifty first edge (104) and the forty fifth edge (92). The fifty second edge (107) is parallel to, and co-planar with, the thirty fifth edge (74). It should be clear now that the fifty first edge (104), the thirty fifth edge (74), the forty fifth edge (92) and the fifty second edge (107) form the periphery of a second bottom surface (108). The second bottom surface (108) and the eleventh side surface (106) share a peripheral edge, namely, the fifty first edge (104). The second bottom surface and the tenth side surface (94) share a peripheral edge, namely, the forty fifth edge (92). The second bottom surface and the ninth side surface (76) share a peripheral edge, namely, the thirty second edge (74). Furthermore, the second bottom surface is parallel to, though not co-planar with, the second top surface (82).

The instant invention further has a fifty third edge (109) extending away from the thirty first point (103) to the twenty seventh point (91). The fifty third edge (109) is perpendicular to, and co-planar with, both the fiftieth edge (102) and the forty fourth edge (90). The fifty third edge (109) is parallel to, and co-planar with, the fifty second edge (107). It should be clear now that the fifty third edge (109), the fiftieth edge (102), the fifty second edge (107) and the forty fourth edge (90) form the periphery of a twelfth side surface (110). The twelfth side surface (110) and the eleventh side surface (106) share a peripheral edge, namely, the fiftieth edge (102). The twelfth side surface (110) and the second bottom surface (108) share a peripheral edge, namely, the fifty second edge (107). The twelfth side surface (110) and the tenth side surface (94) share a peripheral edge, namely, the forty fourth edge (90). Furthermore, the twelfth side surface is parallel to, though not co-planar with, the ninth side surface (76). The twelfth side surface (110) is perpendicular to the second bottom surface (108), the eleventh side surface (106), and the tenth side surface (94).

Figure 10:
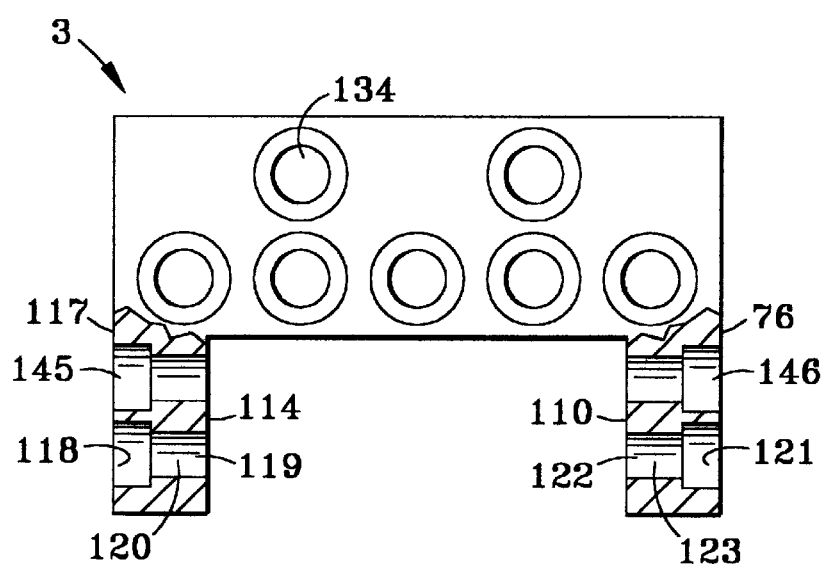
FIG. 10 is a partially cut away plan view of the movable piece of the instant invention.

As per FIGS. 8, 9 and 10, the instant invention further has a fifty fourth edge (111) extending away from the thirtieth point (101) to the twenty sixth point (89). The fifty fourth edge (111) is perpendicular to, and co-planar with; both the forty ninth edge (100) and the forty third edge (88). The fifty fourth edge (111) is parallel to, and co-planar with, the fifty third edge (109). It should be clear now that the fifty fourth edge (111), the forty ninth edge (100), the fifty third edge (109) and the forty third edge (88) form the periphery of a third bottom surface (112). The third bottom surface (112) and the eleventh side surface (106) share a peripheral edge, namely, the edge (100). The third bottom surface (112) and tenth side surface (94) share a peripheral edge, namely, the forty third edge (88). The third bottom surface (112) and the twelfth side surface (110) share a peripheral edge, namely, the fifty third edge (109). Furthermore, the third bottom surface is parallel to, though not co-planar with, the second top surface (82) and the second bottom surface (108). The third bottom surface (112) is perpendicular to the twelfth side surface (110), and the ninth side surface (76).

The instant invention further has a fifty fifth edge (113) extending away from the twenty ninth point (99) to the twenty fifth point (87). The fifty fifth edge (113) is perpendicular to, and co-planar with, both the forty eighth edge (98) and the forty second edge (86). The fifty fifth edge (113) is parallel to, and co-planar with, the fifty fourth edge (111). It should be clear now that the fifty fifth edge (113), the forty eighth edge (98), the fifty fourth edge (111) and the forty second edge (86) form the periphery of a thirteenth side surface (114). The thirteenth side surface (114) and the eleventh side surface (106) share a peripheral edge, namely, the forty eighth edge (98). The thirteenth side surface (114) and the third bottom surface (112) share a peripheral edge, namely, the fifty fourth edge (111). The thirteenth side surface (114) and the tenth side surface (94) share a peripheral edge, namely, the forty second edge (86). Furthermore, the thirteenth side surface is parallel to, though not co-planar with, the ninth side surface (76). The thirteenth side surface (114) is perpendicular to the third bottom surface (112), the eleventh side surface (106), and the tenth side surface (94).

The instant invention further has a fifty sixth edge (115) extending away from the twenty eighth point (97) to the twenty fourth point (85). The fifty sixth edge (115) is perpendicular to, and co-planar with, both the forty seventh edge (96) and the forty first edge (84). The fifty sixth edge (115) is parallel to, and co-planar with, the fifty fifth edge (113). It should be clear now that the fifty sixth edge (115), the forty seventh edge (96), the fifty fifth edge (113) and the forty first edge (84) form the periphery of a fourth bottom surface (116). The fourth bottom surface (116) and the eleventh side surface (106) share a peripheral edge, namely, the forty seventh edge (96). The fourth bottom surface (116) and the thirteenth side surface (114) share a peripheral edge, namely, the fifty fifth edge (113). The fourth bottom surface (116) and the tenth side surface (94) share a peripheral edge, namely, the forty first edge (84). Furthermore, the fourth bottom surface is parallel to, and co-planar with, the second bottom surface (108). The fourth bottom surface (116) is perpendicular to the thirteenth side surface (114), the eleventh side surface (106), and the tenth side surface (94).

Finally, it should be clear now that the fifty sixth edge (115), the fortieth edge (83), the thirty seventh edge (78) and the forty sixth edge (95) form the periphery of a fourteenth side surface (117). The fourteenth side surface (117) and the eleventh side surface (106) share a peripheral edge, namely, the forty sixth edge (95). The fourteenth side surface (117) and the fourth bottom surface (116) share a peripheral edge, namely, the fifty sixth edge (115). The fourteenth side surface (117) and the tenth side surface (94) share a peripheral edge, namely, the fortieth edge (83). The fourteenth side surface (117) and the second top surface (82) share a peripheral edge, namely, the thirty seventh edge (78). Furthermore, the fourteenth side surface is parallel to, although not co-planar with, the ninth side surface (76) and the thirteenth side surface (114). The fourteenth side surface (117) is perpendicular to the fourth bottom surface (116), the second top surface (82), the eleventh side surface (106), and the tenth side surface (94).

Those familiar with the art will immediately recognize that the movable piece described above is essentially in the form of a squared-off "U" shape or arch shape. It should be further noted that in the preferred embodiment, the thirty sixth edge (77) and the thirty ninth edge (80) each have a length of approximately 3 and ¼ inches. The thirty second edge (69) has a height of approximately 2 and ⅛ inches. The thirty second edge (69), the thirty fourth edge (72), the fortieth edge (83) and the forty sixth edge (95) all have the same height. The forty third edge (88) and the forty ninth edge (100) each have a length of approximately 2 and ¼ inches. The forty second edge (86) has a height of approximately ¹⁵⁄₁₆ of one inch. The forty second edge (86), the forty eighth edge (98), the forty fourth edge (90) and the fiftieth edge (102) all have the same height. The fifty sixth edge (115) has a length of approximately ¾ of one inch. The fifty sixth edge (115), the fifty fifth edge (113) the fifty second edge (107), the thirty fifth edge (74), the fifty fourth edge (111), and the fifty third edge (109) all have the same length. Finally, the forty first edge (84) has a length of approximately ½ of one inch. The forty first edge (84), the forty seventh edge (96) the forty fifth edge (92) and the fifty first edge (104) all have the same length.

Figure 11:
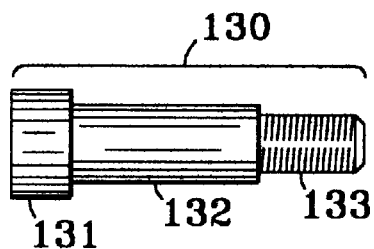
FIG. 11 is a side view of the first fastener.

As was noted above, the movable piece (3) is pivotably attached to the stable piece (2). In the preferred embodiment this is accomplished through the use of pivot attachment means connecting the movable piece to the stable piece. As per FIGS. 8, 9 and 10, this is accomplished through the incorporation of movable piece attachment channels. In the preferred embodiment, a first movable piece attachment channel may be further defined by noting that the fourteenth side surface (117) has a first hole (118). As per FIGS. 10 and 11, the thirteenth side surface (114) has a second hole (119). The first hole (118) and the second hole (119) have a first bore (120) connecting them, the first bore permitting an object to pass into the movable piece (3) through the first hole (118) and out of the second hole (119). Furthermore, the bore (120) is smooth. The first hole (118) has a diameter greater than a diameter of the second hole (119), and the bore (120) is coaxial with both the first hole (118) and the second hole (119), a diameter of the bore proximate to the first hole being equal to the diameter of the first hole and a diameter of the bore proximate to the second hole being equal to the diameter of the second hole (119). This effectively creates a shoulder near the midpoint of the bore, between the first hole and the second hole. The first hole (118), first bore (120), and second hole (119) together constitute the first movable piece attachment channel.

As per FIGS. 8, 9 and 10, in the preferred embodiment, a second movable piece attachment channel may be further defined by noting that the ninth side surface (76) has a third hole (121). As per FIGS. 9 and 12, the twelfth side surface (110) has a fourth hole (122). The third hole (121) and the fourth hole (122) have a second bore (123) connecting them, the second bore permitting an object to pass into the movable piece (3) through the third hole (121) and out of the fourth hole (122). Furthermore, the second bore (123) is smooth. The third hole (121) has a diameter equal to the diameter of the first hole (118). The fourth hole (122) has a diameter equal to the diameter of the second hole (119). The second bore (123) is coaxial with both the third hole (121) and the fourth hole (122), a diameter of the bore proximate to the third hole being equal to the diameter of the third hole and a diameter of the bore proximate to the fourth hole being equal to the diameter of the fourth hole (123). This effectively creates a shoulder near the midpoint of the bore, between the third hole and the fourth hole. The third hole (121), second bore (123), and fourth hole (122) together constitute the second movable piece attachment channel.

As per FIGS. 1, 5, 6, 7 and 10, the stable piece (2) is constructed to permit the pivotal attachment thereto of the movable piece (3). In the preferred embodiment this is further accomplished by having a fifth hole (124) passing through the fifth side surface (58), the fifth hole having a third bore (125) and a fourth bore (126). The third bore (125) being smooth and having a diameter equal to a diameter of the fifth hole. The fourth bore (126) being threaded so that it may accept a fastener such as a threaded bolt and having a diameter less than the diameter of the fifth hole (124). The fifth hole (124), the third bore (125) and the fourth bore (126) all being co-axial with one another, and the diameter of the fifth hole (124) being equal to the diameter of the second hole (119).

The stable piece (2) further having a sixth hole (127) passing through the seventh side surface (66), the sixth hole having a fifth bore (128) and a sixth bore (129). The fifth bore (128) being smooth and having a diameter equal to a diameter of the fifth hole (124). The sixth bore (129) being threaded so that it may accept a fastener such as a threaded bolt and having a diameter less than the diameter of the fifth hole (124). The sixth hole (127), the fifth bore (128) and the sixth bore (129) all being co-axial with one another, and the diameter of the sixth hole (127) being equal to the diameter of the fourth hole (122). The fifth hole (124), the third bore (125) and the fourth bore (126), and the sixth hole (127), the fifth bore (128) and the sixth bore (129) collectively make up what is known to applicant as the first retention passages.

As per FIGS. 1, 5, 6, 7, 8, 9 and 10, the pivotal attachment of the movable piece to the stable piece may now be better understood. The movable piece (3) is placed in contact with the stable piece (2) so that the first bore (120) and the third bore (125) are aligned and co-axial with one another. The second bore (123) and the fifth bore (128) are also aligned and co-axial with one another. Furthermore, when so assembled, the twenty third edge (49) is adjacent to the forty first edge (84), and the fourth bottom surface (116) is co-planar with the first bottom surface (50).

Figure 15:
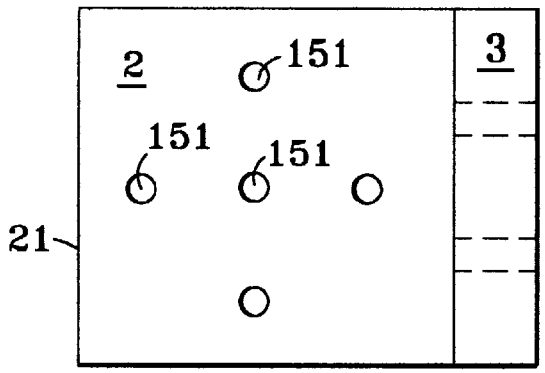
FIG. 15 is an overhead view of the second embodiment of the instant invention.

In the preferred embodiment, as per FIG. 15, a first fastener (130) is used to permit the pivotal attachment of the movable piece (3) to the stable piece (2), the first fastener (130) being a threaded bolt. The first fastener (130) having a head section (131), a smooth shaft section (132) and a threaded shaft section (133), and being commonly known as a hexagonal or fluted type socket head shoulder screw. The head section having a diameter sized for snug insertion into the first hole (118) and the third hole (121). The smooth shaft section (132) having a diameter sized for snug insertion through the first bore (120) and the third bore (125), as well as the second bore (123) and the fifth bore (128). The threaded shaft section (133) having a diameter sized, and threads spaced for removably screwing into the fourth bore (126) as well as the sixth bore (129).

It should be noted that the movable piece (3) has a number of first drill guide passages (134) passing therethrough. These first drill guide passages (134) pass completely through the tenth side surface (94), the body of the movable piece and the eleventh side surface (106), thereby permitting a generally cylindrical object (such as a drill bit) to pass through the body of the movable piece by entering the first drill guide passage on the tenth side surface (94) and exiting the first drill guide passage on the eleventh side surface (106). In the preferred embodiment, the first drill guide passages are essentially tubular and have an interior diameter of approximately ⅜th of one inch, however Applicant believes that an interior diameter of approximately 5/16 of one inch would work equally well. The axis of the first drill guide passages are perpendicular to the thirty sixth edge (77) and the thirty second edge (69).

Furthermore, as per FIGS. 1, 8 and 9 in the preferred embodiment there are a total of seven first drill guide passages (134). These first drill guide passages are arranged in two rows. The first row has five first drill guide passages in a row locatable as extending from proximate to the thirty second edge (69) across the tenth side surface (94) to proximate to the fortieth edge (83). The first row of first drill guide passages is also locatable as proximate to the forty third edge (88). The second row of first drill guide passages has two first drill guide passages. In the preferred embodiment, the distance between the two first drill guide passages of the second row is equal and they are further locatable on the tenth side surface (94) as being between the first row of first drill guide passages and the thirty sixth edge (77). Clearly, more or less drill guide passages could be utilized.

Furthermore, in the preferred embodiment as per FIGS. 1 and 4, the stable piece has a pair of second drill guide passages (135) passing therethrough. The second drill guide passages are configured as are the first drill guide passages, with the second drill guide passages passing completely through the stable piece (2) first top surface (22) and the stable piece first bottom surface (50).

Applicant believes that the instant invention will have a longer useful life if all drill guide passages incorporate a bushing manufactured from a material which can better tolerate the wear and tear which will occur when a rotating drill bit passes through the passages. In the preferred embodiment, these bushings are made of brass, though other strong metals such as steel could be used instead. In the event that bushings are included in the instant invention, the drill guide passages must be enlarged sufficiently to permit the bushing to be press fit therein, and the inner diameter of the bushing must be sufficiently large so as to accommodate the passage therethrough of the rotating drill bit. In the preferred embodiment, Applicant utilizes bushings having an interior diameter of 3/8 of one inch, though this may differ depending upon the size of the drill bit which is to be utilized to drill the dowel pin holes.

Figure 16:
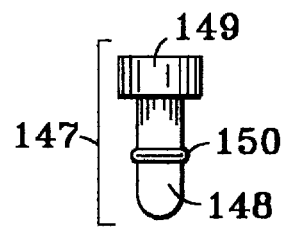
FIG. 16 is a side elevational view of the stop pin.
Figure 17:
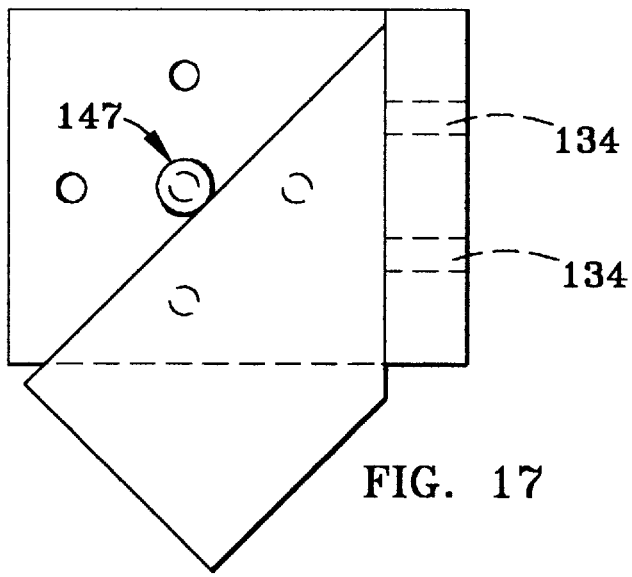
FIG. 17 is an overhead view of the second embodiment of the instant invention having thereupon a work piece.
Figure 18:
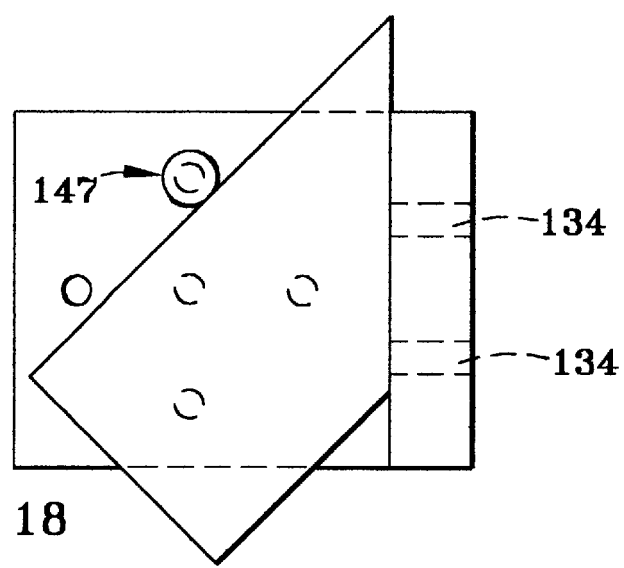
FIG. 18 is an overhead view of the second embodiment of the instant invention having thereupon a work piece.

When fully assembled, as per FIG. 1, with the first fastener (130) pivotably attaching the movable piece (3) to the stable piece (2), the first bore (120) and the second bore (123) of the movable piece may pivot about the smooth shaft section (132) of the first fastener (130), thereby permitting drilling of dowel pin guide holes into articles having compoundly angled surfaces. This may be better understood by reference to FIGS. 16, 17 and 18.

Figure 12:
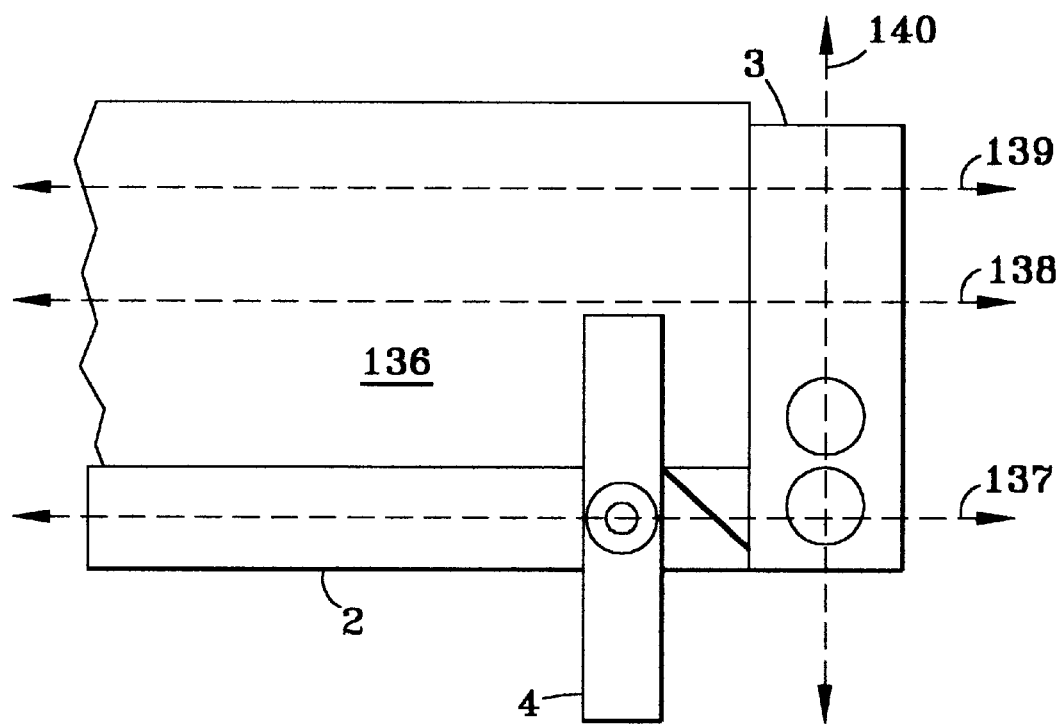
FIG. 12 is a side elevational view of the completed invention including a work piece.

As per FIG. 12, the instant device may be oriented for drilling dowel guide holes into an article having right angle surfaces (136). In this case, the stable piece first bottom surface (50) will be at a right angle to the eleventh side surface (106) and will be parallel to and co-planar with the fourth bottom surface (116) and the second bottom surface (108). It is further useful to now describe a number of planes. As per FIG. 12, a first horizontal plane (137) may be described as bisecting the third side surface (40), the first side surface (30), the eighth side surface (67) and the second side surface (38), about midway between the first top surface (22) and the first bottom surface (50). A second horizontal plane (138) may be defined as parallel to, though not co-planar with, the first horizontal plane (137), the second horizontal plane further axially bisecting the first drill guide passages (134) locatable proximate to the forty third edge (88), the second plane further passing through the tenth side surface (94) and the eleventh side surface (106), parallel to, though not co-planar with, the second top surface (82). A third horizontal plane (139) may be defined as parallel to, though not co-planar with, the second horizontal plane (138), the second horizontal plane further axially bisecting the first drill guide passages (134) of the second row, locatable between the first drill guide passages of the first row and the thirty sixth edge (77), the third horizontal plane further passing through the tenth side surface (94) and the eleventh side surface (106), parallel to, though not co-planar with, the second top surface (82). Finally, a first vertical plane (140) may be defined as passing through the movable piece, bisecting the ninth side surface (76), the fourteenth side surface (117), the third bottom surface (112) and the second top surface (82), passing transaxially through the first drill guide passage (134), and being parallel to, though not coplanar with the tenth side surface (94) and the eleventh side surface (106).

As per FIG. 12, an article having right angles is placed on the instant device for drilling dowel pin guide holes. These holes may be drilled using the first drill guide passages locatable in the first row or the second row. Those holes drilled utilizing the first drill passages of the first row would be locatable on the second horizontal plane (138), while those drilled utilizing the second row would be locatable on the third horizontal plane (139). The choice of which row to use when drilling a particular article is largely dependent upon the dimensions of the article and the desired location of the dowel pin holes.

Figure 13:
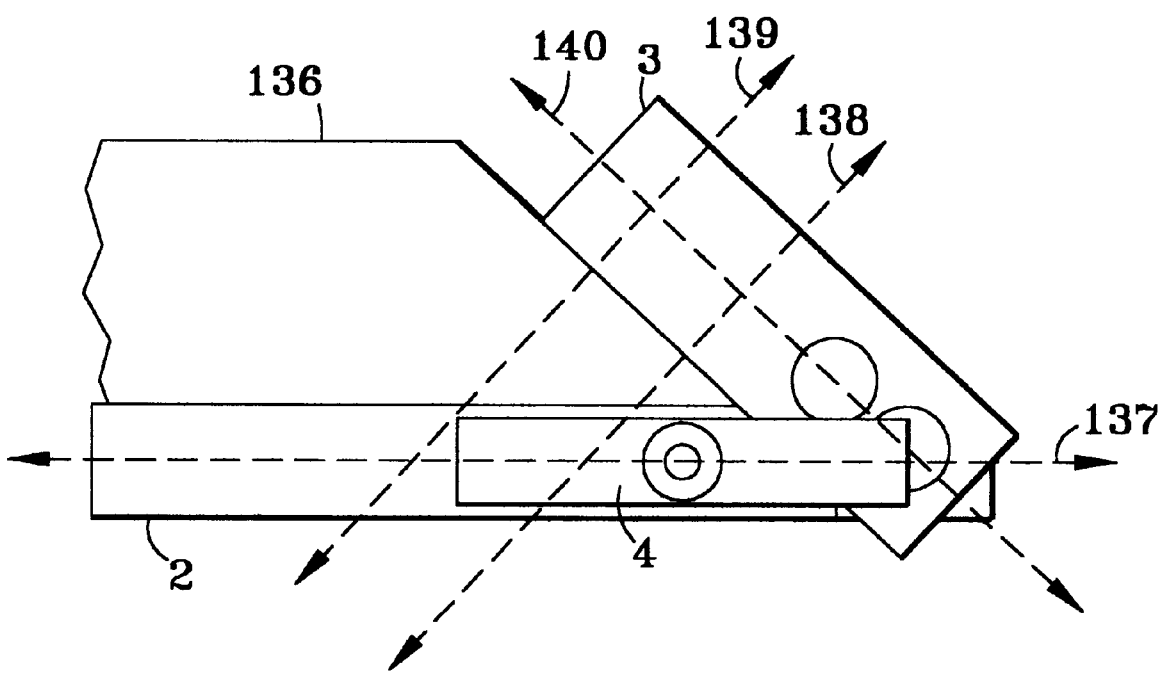
FIG. 13 is a side elevational view of the completed invention including a work piece having a 45 degree angled surface.
Figure 14:
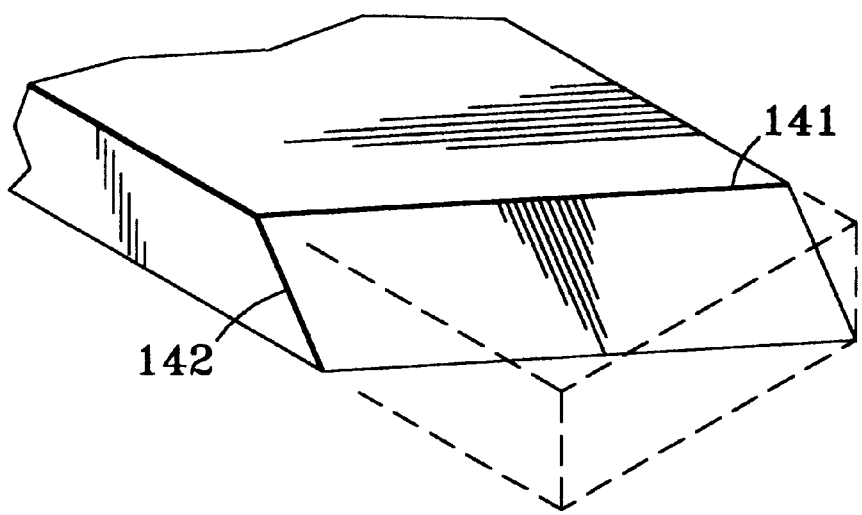
FIG. 14 is a view of a work piece.

As per FIG. 13, the instant device is also useful when drilling dowel pin guide holes on articles having surfaces which are not all at right angles to one another. For example, one might wish to drill dowel pin guide holes in an article having a surface which is at a 45 degree angle. In this case, the angled section of the article is placed in direct contact with the tenth side surface (94) by adjusting the movable piece (3) so that the tenth side surface makes contact with the angled surface of the article to be drilled. The user may then utilize the first drill guide passages locatable in the first row or the second row, depending upon the thickness of the article in which dowel pin guide holes are to be drilled.

Furthermore, as per FIGS. 13, 14a, 14b and 14c, the instant invention is especially useful when drilling dowel pin guide holes into articles having compound angles. For example, as was described above, an article could have a surface cut at a first 45 degree angled section (141). The angled section might be further cut to include a second 45 degree angled section (142). An example of such an article would be a portion of a picture frame wherein four frame pieces each have a first and second end cut at a 45 degree angle. The builder of such a frame might also wish the frame to extend out of the plane in which the picture the frame will surround exists. In such a case, each angled end would be further cut to include another angle such that when assembled, the frame angled outwardly, away from the surface upon which it would eventually hang. As per FIG. 14a, 14b and 14c, an example of such a compound angle may be better understood. The wooden article has been cut to include the first 45 degree angled section (141) at its end. The end having the 45 degree angle has been further cut so that it also includes the second 45 degree angled section (142). This may then be referred to as an article having a compound angle.

Use of the instant invention to drill dowel pin guide holes in an article having compound angles may now be better understood. The first fasteners (130) are loosened enough to permit the movable piece (3) to pivot easily relative to the stable piece (2). The article to be drilled is place upon the stable piece (2) such that the first 45 degree angled section (141) is in contact with the tenth side surface (94). The movable piece (3) is then pivoted toward the article to be drilled such that the tenth side surface (94) is also in contact with the second 45 degree angled section (142). When the movable piece (3) is at the desired angle relative to the stable piece (2), the first fastener (130) is re-tightened. It should be apparent that the second horizontal plane (138) and the third horizontal plane (139) are no longer parallel to the first horizontal plane, but are instead at a 45 degree angle relative to the first horizontal plane. Furthermore, the first vertical plane (140) is no longer at a 90 degree angle relative to the first horizontal plane (137) but is instead also at a 45 degree angle relative to the first horizontal plane (137).

Once in the desired position, the dowel pin guide holes may be drilled into the article, using the first drill guide passages. Whether one utilizes the first drill guide passages found in the first row or the second row is largely dependent upon the thickness of the article being drilled, and upon the compound angle involved. For example, if the article has a first 45 degree angle (141), but instead of a second 45 degree angle (142) has a 15 degree angle, one might choose either the first row or the second row. But in the case of a first 45 degree angle and a second 45 degree angle, it is more likely that one would use the first drill guide passages found in the second row due to the fact that the first row would produce dowel pin guide holes which would be too close to the surface of the article being drilled, and might well weaken the article's structural integrity.

Whether one chooses to utilized the first drill guide passages found in the first or the second row, it is extremely important to utilize the first drill guide passages from the same row on each article which is ultimately to be connected by the dowel pins. This is preferred as it will produce the best fit between the articles to be assembled, and will increase the likelihood that the abutting edges of the assembled articles will match up an require far less filing or sanding in order to form a smooth edge.

Another feature of the instant invention which further serves to aid the user in properly locating the dowel pin guide holes is the first rotatable end stop bar (4) and the second rotatable end stop bar (5). As per FIGS. 1, 2 and 7, the first rotatable end stop bar is rotatably attached on the second side surface (38), distally from the fourteenth edge (31). The second rotatable end stop bar is rotatably attached, directly across from the first rotatable end stop bar, on the first side surface (30). A first side surface hole having a threaded bore (143) is locatable on the first side surface (30), and extends into the stable piece (2), the axis of the bore being parallel to, though not co-planar with, the eighteenth edge (39) and the fourth edge (13). A second side surface hole having a threaded bore (144) is locatable on the second side surface (38), and extends into the stable piece (2), the axis of the bore being parallel to, though not co-planar with, the eighteenth edge (39) and the fourth edge (13), the axis of the bore being co-axial with the axis of the bore of the first side surface hole threaded bore (143). It should be readily apparent that the first side surface hole having a threaded bore and the second side surface hole having a threaded bore are both essentially blind internal threaded holes, and they may collectively be referred to as end stop bar retention holes.

As per FIGS. 1, 5, 7 and 12, the first rotatable end stop bar (4) is essentially a rectangular bar having a square cross section. The second rotatable end stop bar (5) is identical to the first rotatable end stop bar (4). The first rotatable end stop bar (4) has a bar passage passing transaxially therethrough at about the midpoint along the long axis. The bar passage permits a rotatable attachment means to pass completely through the first rotatable end stop bar (4), a diameter of the bar passage being slightly greater than a diameter of the rotatable attachment means. In the preferred embodiment, the rotatable attachment means is a threaded bolt, the threaded bolt having a head section with a diameter greater than the threaded section and also greater than the bar passage. The first rotatable end stop bar is placed against the second side surface (38) such that the bar passage and the second side surface hole threaded bore (144) are co-axial with one another. The rotatable attachment means is then passed through the bar passage, extending and being threaded into the threaded bore. The rotatable attachment means is tightened sufficiently so that the first rotatable end stop bar may rotate relative to the first horizontal plane (137) when so desired, but will remain in whatever orientation it is placed until it is actively rotated by the user. The second rotatable end stop bar (5) is configured identically to the first rotatable end stop bar (4) is attached to the first side surface (30) in exactly the same manner as the second rotatable end stop bar (5) is attached to the second side surface (38).

The use and operation of the first rotatable end stop bar (4) and the second rotatable end stop bar (5) may now be understood. When drilling dowel pin guide holes in an article, it is extremely helpful to place the guide holes at a set distance from the end of the article. In the prior art, this was often accomplished by measuring the distance, and clamping the article to the drill guide. However, Applicant has discovered that it is easier and more efficient to incorporate and use the rotatable end stop bars instead. A user of the instant invention places the article to be drilled flat upon the stable piece (2), with the second rotatable end stop bar (5) positioned such that its long axis is parallel to the fourteenth edge (31). As per FIG. 13, the first rotatable end stop bar (4) is positioned such that its long axis is parallel to the first horizontal plane (137). One end of the article to be drilled is pressed against the second rotatable end stop bar (5). The user may find it helpful at this point to clamp the article to be drilled to the instant invention. The user then places the drill bit through one of the first drill guide passages (134) and drills the article. For example, if the user wished to have the hole drilled in close proximity to the end of the article to be drilled, the user would select the first drill guide passage (134) most proximate to the fortieth edge (83). To drill a hole near the opposite end of the article to be drilled, the user would then simply rotate the second rotatable end stop bar (5) so that its long axis was parallel to the first horizontal plane (137). Next, as per FIGS. 2 and 12, the user would rotate the first rotatable end stop bar (4) so that its long axis was parallel to the fourteenth edge (31). The end of the article to be drilled now would be pressed against the first rotatable end stop bar (4). The user would then select the first drill guide passage (134) most proximate to the thirty second edge (69), and drill the dowel pin guide hole using the first drill guide passage (134) to guide the drill bit. The user may find it helpful to have clamped the article to be drilled to the instant invention, prior to drilling. In this fashion, each hole drilled will be similarly aligned on the article to be drilled, ensuring a better fit amongst the articles when assembled. Once again, the particular first drill guide passage chosen will be dependent upon the dimensions of the article to be drilled and the location desired by the user.

Applicant has discovered that it is useful to include a second set of movable piece attachment areas proximate to the first set. The second set of movable piece attachment areas is identical in form to the first set. As per FIGS. 8, 9, 10 and 12, a third movable piece attachment channel (145) is configured identically to the first movable piece attachment channel. The third movable piece attachment channel (145) is axially bisected by the first vertical plane (140) and is locatable between the first movable piece attachment channel and the second horizontal plane (138). A fourth movable piece attachment channel (146) is configured identically to the second movable piece attachment channel. The fourth movable piece attachment channel (146) is axially bisected by the first vertical plane (140) and is locatable between the second movable piece attachment channel and the second horizontal plane (138). Inclusion of the third and fourth movable piece attachment channels provides the user of the instant device with a wider range of choices in terms of the elevation of the second and third horizontal planes relative to the first horizontal plane. This in turn allows the user to drill dowel pin guide holes in still more articles having differing thicknesses.

Finally, it should be apparent that the range of motion, or adjustability of the movable piece may be varied somewhat by increasing or decreasing the angle or pitch of the first and second inclined surfaces.

As per FIGS. 15, 16, 17 and 18, in another embodiment of the instant invention, Applicant includes a dowel pin drill guide lateral offset means. In this second embodiment, the dowel pin drill guide lateral offset means is a stop pin and stop pin hole. The stop pin (147) is an essentially "T" shaped pin having a cylindrical stem (148) and a cylindrical head (149), the cylindrical head and the cylindrical stem being attached to one another co-axially. The cylindrical head has a diameter greater than a diameter of the cylindrical stem. Furthermore, in the preferred embodiment, the cylindrical stem has thereupon a radius groove, the radius groove being sized for the insertion therein of an O-ring (150). Applicant believes that the device functions best when the O-ring is 1/16th of one inch in diameter. When the O-ring is in place in the radius groove, the O-ring's outer surface extends slightly beyond the cylindrical stem's diameter thereby ensuring a sung fit when the stop pin stem is inserted into the stop pin hole.

Applicant includes at least one stop pin hole (151) in the stable piece (2). When a stop pin hole and stop pin is included in the instant invention, Applicant does not include the second pair of drill guide passages (135). The stop pin hole (151) is configured nearly identically to the second pair of drill guide passages. Like the second pair of drill guide passages, the stop pin hole (151) passes completely through the stable piece first top surface (22) and the stable piece first bottom surface (50) such that a cylindrical object having a diameter less than the diameter of the stop pin hole may be passed through the stop pin hole and pass completely through the first top surface (22) and emerge out of the first bottom surface (50). While in the preferred embodiment the stop pin hole passes completely through both the first top surface and the first bottom surface, it is possible for the hole to pass through the top surface only, so long as the hole is deep enough to permit the stop pin stem to be inserted into the stable piece and be firmly, though removably, retained therein. The stop pin hole (151) should have a diameter slightly larger than the diameter of the stop pin stem (148) and approximately equal to the outermost diameter of the O-ring when the O-ring is attached to the stop pin stem such that the stop pin stem may be inserted into the stop pin hole and be retained therein by the combination stop pin stem/O-ring.

Applicant prefers to include a number of stop pin holes so that the stop pin may be relocated in a number of different locations on the stable piece. By so relocating the stop pin, it is possible to change position of the dowel pin guide hole which will be drilled in the work piece. For example, as per FIG. 17, the stop pin may be located near a mid-point of the stable piece (2). A work piece having a 45 degree angle surface may be placed on the stable piece (2) such that the angled surface is in contact with the tenth side surface (94) of the movable piece (3). One may then drill the dowel pin guide holes using, for example, the drill guide passages located in the second row of first drill guide passages (134). However, if one preferred that the dowel pin guide hole was offset slightly, one need only relocate the stop pin to modify the dowel pin guide hole location. As per FIGS. 2 and 18, the stop pin could be moved to a stop pin hole more proximate to the first edge (7). Once again, the work piece having 45 degree angled surface could be placed upon the stable piece (2) such that the angled surface was in direct contact with the tenth side surface (94), and also in direct contact with the stop pin (147). By so relocating the stop pin, the work piece is also relocated, thus offsetting the dowel pin guide hole which is to be drilled. It will be readily understood that the offsetting which takes place is along the surface to be drilled, toward or away from the first edge (7) or the seventh edge (19), the dowel pin drill guide hole in either case remaining in the same horizontal plane. This embodiment works equally well with articles having compound angles.

Applicant also notes that by varying the diameter of the stop pin head (149) minor offsetting may be accomplished. Therefore, it may be desirable to include more than one stop pin along with the instant invention, each stop pin having a different stop pin head diameter. By increasing or decreasing the diameter of the stop pin head, one increases or decreases the lateral offsetting of the dowel pin guide hole. It should be readily apparent that the ability to move the stop pin to various locations, along with the inclusion of stop pins having stop pin heads of varying diameters will provide the user of the instant invention with the ability to make numerous changes in the amount of dowel pin guide hole offsetting, thereby providing the user even greater versatility in locating dowel pin guide holes, the versatility being far beyond any thus far provided by the prior art.

It should be noted that while the lateral offset means has been described as a second embodiment of the instant invention, said lateral offset means could be used as an improvement to the prior art as well. For example, the lateral offset means could be incorporated into U.S. Pat. No. 2,798,520 issued to J. M. Maskulka on Jul. 9, 1957. For understanding's sake, U.S. Pat. No. 2,798,520 is herein incorporated by reference. When the lateral offset means is to be used in conjunction with prior art devices such as that found in Maskulka, the stop pin holes would be located on the flat rectangular body member, and would pass through the flat rectangular body member, the stop pin hole axis being parallel to, though not co-planar with, the downturned right angled flange. It should be clear that the pair of uniformly spaced openings and tubular members found in Maskulka correspond to the first drill guide passages of the instant invention.

I claim:
1. An Adjustable Dowel Pin Hole Drilling Guide comprising;
  A. a stable piece,
    I. the stable piece having a pair of oppositely aligned first retention passages,
    II. the stable piece having a dowel pin drilling guide hole,
  B. a moveable piece,
    I. the movable piece having a plurality of dowel pin drilling guide holes,
      a. the dowel pin drilling guide holes being perpendicular to the stable piece dowel pin drilling guide hole,
    II. the movable piece having a pair of oppositely aligned attachment channels,
      a. the oppositely aligned attachment channels being co-axial with the stable piece oppositely aligned first retention passages,
      b. the oppositely aligned attachment channels being perpendicular to the movable piece dowel pin drilling guide holes and perpendicular to the stable piece dowel pin drilling guide hole,
    III. the movable piece being pivotably attached to the stable piece by means for pivotal attachment,
      a. the means for pivotal attachment passing through the attachment channels and engaging the stable piece first retention passages.

2. An Adjustable Dowel Pin Hole Drilling Guide comprising;
  A. a stable piece,
    I. the stable piece having a pair of oppositely aligned first retention passages,
    II. the stable piece having a dowel pin drilling guide hole, III. the stable piece having a pair of oppositely aligned end stop bar retention holes, B. a moveable piece,
   I. the movable piece having a plurality of dowel pin drilling guide holes,
      a. the dowel pin drilling guide holes being perpendicular to the stable piece dowel pin drilling guide hole,
   II. the movable piece having a first pair of oppositely aligned attachment channels,
      a. the first pair of oppositely aligned attachment channels being coaxial with the stable piece oppositely aligned first retention passages,
      b. the first pair of oppositely aligned attachment channels being perpendicular to the movable piece dowel pin drilling guide holes
      c. the first pair of oppositely aligned attachment channels being locatable below a first horizontal plane,
   III. the movable piece having a second pair of oppositely aligned attachment channels,
      a. the second pair of oppositely aligned attachment channels being perpendicular to the movable piece dowel pin drilling guide holes
      b. the second pair of oppositely aligned attachment channels being parallel to the first pair of oppositely aligned attachment channels,
      c. the second pair of oppositely aligned attachment channels being locatable above the first horizontal plane,
   IV. the movable piece being pivotably attached to the stable piece by means for pivotal attachment,
      a. the means for pivotal attachment passing through the attachment channels and engaging the stable piece first retention passages.

C. a first rotatable end stop bar,
   I. the first rotatable end stop bar being rotatably attached to the stable piece, D. a second rotatable end stop bar,
   II. the second rotatable end stop bar being rotatably attached to the stable piece, opposite the first rotatable end stop bar.

3. An Adjustable Dowel Pin Hole Drilling Guide comprising;

A. a stable piece,
   I. the stable piece having a first side surface,
   II. the stable piece having a first top surface,
      a. the first top surface being attached to the first side surface along a first edge,
   III. the stable piece having a second side surface,
      a. the second side surface being attached to the first top surface along a seventh edge,
   IV. the stable piece having a third side surface,
      a. the third side surface being attached to the first top surface along an eighth edge,
   V. the stable piece having a first bottom surface,
      a. the first bottom surface being attached to the first side surface along an eleventh edge,
      b. the first bottom surface being attached to the second side surface along a fifteenth edge,
      c. the first bottom surface being attached to the third side surface along an eighteenth edge,
   VI. the stable piece having an eighth side surface,
      a. the eighth side surface being attached to the first top surface along a fourth edge,
      b. the eighth side surface being attached to the first bottom surface along a twenty first edge,
   VII. the stable piece having a fifth side surface,
      a. the fifth side surface being attached to the first top surface along a third edge,
      b. the fifth side surface being attached to the first bottom surface along a twenty second edge,
      c. the fifth side surface being attached to the eighth side surface along a twenty seventh edge,
   VIII. the stable piece having a seventh side surface,
      a. the seventh side surface being attached to the first top surface along a fifth edge,
      b. the seventh side surface being attached to the first bottom surface along a twentieth edge,
      c. the seventh side surface being attached to the eighth side surface along a thirty first edge,
   IX. the stable piece having a first inclined surface,
      a. the first inclined surface being attached to the first top surface along a second edge,
      b. the first inclined surface being attached to the first side surface along a thirteenth edge,
      c. the first inclined surface being attached to the fifth side surface along a twenty fifth edge,
   X. the stable piece having a fourth side surface,
      a. the fourth side surface being attached to the first inclined surface along a twenty sixth edge,
      b. the fourth side surface being attached to the first side surface along a twelfth edge,
      c. the fourth side surface being attached to the fifth side surface along a twenty fourth edge,
      d. the fourth side surface being attached to the first bottom surface along a twenty third edge,
   XI. the stable piece having a second inclined surface,
      a. the second inclined surface being attached to the first top surface along a sixth edge,
      b. the second inclined surface being attached to the seventh side surface along a twenty ninth edge,
      c. the second inclined surface being attached to the second side surface along a seventeenth edge,
   XII. the stable piece having a sixth side surface,
      a. the sixth side surface being attached to the second inclined surface along a thirtieth edge,
      b. the sixth side surface being attached to the seventh side surface along a twenty eighth edge,
      c. the sixth side surface being attached to the first bottom surface along a nineteenth edge,
      d. the sixth side surface being attached to the second side surface along a sixteenth edge,
   XIII. the stable piece having a pair of oppositely aligned first retention passages,
      a. one of the pair of oppositely aligned first retention passages passing through the seventh side surface, proximate to the thirty first edge, about midway between the fifth edge and the twentieth edge,
      b. one of the pair of oppositely aligned first retention passages passing through the fifth side surface, proximate to the twenty seventh edge, about midway between the twenty second edge and the third edge,
   XIV. the stable piece having a dowel pin drilling guide hole,
      a. the dowel pin drilling guide hole passing through the stable piece first top surface and the stable piece first bottom surface,
   XV. the stable piece having a pair of oppositely aligned end stop bar retention holes,
      a. the pair of oppositely aligned end stop bar retention holes being blind and internally threaded,
      b. one of the pair of oppositely aligned end stop bar retention holes passing through the first side surface, distally from the tenth edge, approximately midway between the first edge and the eleventh edge,
c. one of the pair of oppositely aligned end stop bar retention holes passing through the second side surface, distally from the fourteenth edge, approximately midway between the seventh edge and the fifteenth edge, B. a moveable piece,
I. the movable piece being essentially "U" shaped,
II. the movable piece having a tenth side surface,
III. the movable piece having a second top surface,
   a. the second top surface being attached to the tenth side surface along a thirty sixth edge,
   b. the second top surface being perpendicular to the tenth side surface,
IV. the movable piece having a ninth side surface,
   a. the ninth side surface being attached to the tenth side surface along a thirty second edge,
   b. the ninth side surface being perpendicular to the tenth side surface,
   c. the ninth side surface being attached to the second top surface along a thirty third edge,
   d. the ninth side surface being perpendicular to the second top surface,
V. the movable piece having a fourteenth side surface,
   a. the fourteenth side surface being attached to the second top surface along a thirty seventh edge, and being perpendicular to the second top surface,
   b. the fourteenth side surface being attached to the tenth side surface along a fortieth edge, and being perpendicular to the tenth side surface,
VI. the movable piece having an eleventh side surface,
   a. the eleventh side surface being attached to the second top surface along a thirty ninth edge, and being perpendicular to the second top surface and parallel with the tenth side surface,
   b. the eleventh side surface being attached to the ninth side surface along a thirty fourth edge, and being perpendicular to the ninth side surface,
VII. the movable piece having a third bottom surface,
   a. the third bottom surface being attached to the tenth side surface along a forty third edge, and being perpendicular to the tenth side surface,
   b. the third bottom surface being attached to the eleventh side surface along a forty ninth edge, and being perpendicular to the eleventh side surface and parallel with the second top surface,
VIII. the movable piece having a twelfth side surface,
   a. the twelfth side surface being attached to the eleventh side surface along a fiftieth edge, the twelfth side surface being perpendicular to the eleventh side surface,
   b. the twelfth side surface being attached to the third bottom surface along a fifty third edge, the twelfth side surface being perpendicular to the third bottom surface,
   c. the twelfth side surface being attached to the tenth side surface along a forty fourth edge, the twelfth side surface being perpendicular to the tenth side surface and parallel with the ninth side surface,
IX. the movable piece having a thirteenth side surface,
   a. the thirteenth side surface being attached to the eleventh side surface along a forty eighth edge, and being perpendicular to the eleventh side surface and parallel with the twelfth side surface,
   b. the thirteenth side surface being attached to the third bottom surface along a fifty fourth edge, and perpendicular to the third bottom surface,
   c. the thirteenth side surface being attached to the tenth side surface along a forty second edge, and being perpendicular to the tenth side surface,
X. the movable piece having a second bottom surface,
   a. the second bottom surface being attached to the eleventh side surface along a fifty first edge, the second bottom surface being perpendicular to the eleventh side surface and parallel with the third bottom surface,
   b. the second bottom surface being attached to the tenth side surface along a forty fifth edge, the second bottom surface being perpendicular to the tenth side surface,
   c. the second bottom surface being attached to the ninth side surface along a thirty fifth edge, and being perpendicular to the ninth side surface,
   d. the second bottom surface being attached to the twelfth side surface along a fifty second edge, the second bottom surface being perpendicular to the twelfth side surface,
XI. the movable piece having a fourth bottom surface,
   a. the fourth bottom surface being attached to the eleventh side surface along a forty seventh edge, and being perpendicular to the eleventh side surface,
   b. the fourth bottom surface being attached to the tenth side surface along a forty first edge, the fourth bottom surface being perpendicular to the eleventh side surface,
   c. the fourth bottom surface being attached to the fourteenth side surface along a fifty sixth edge, the fourth bottom surface being perpendicular to the fourteenth side surface,
   d. the fourth bottom surface being attached to the thirteenth side surface along a fifty fifth edge, the fourth bottom surface being perpendicular to the thirteenth side surface and parallel with the second bottom surface, the third bottom surface and the second top surface,
XII. the movable piece having a first row of first drill guide passages,
   a. the first row of first drill guide passages being located between the thirty fourth edge and a forty sixth edge, the forty sixth edge being parallel to and co-planar with, the thirty fourth edge,
   b. the first row of first drill guide passages passing through the tenth side surface and the eleventh side surface,
   c. the first row of first drill guide passages being bisected by a second horizontal plane,
   d. the first row of first drill guide passages being proximate to the forty ninth edge,
XIII. the movable piece having a second row of first drill guide passages,
   a. the second row of first drill guide passages being located between the thirty fourth edge and a forty sixth edge, the forty sixth edge being parallel to and co-planar with, the thirty fourth edge,
   b. the second row of first drill guide passages passing through the tenth side surface and the eleventh side surface,
   c. the second row of first drill guide passages being bisected by a third horizontal plane,
   d. the second row of first drill guide passages being proximate to a thirty ninth edge,
XIV. the movable piece having a first pair of oppositely aligned attachment channels, a. the first pair of oppositely aligned attachment channels being co-axial with the stable piece oppositely aligned first retention passages,
b. the first pair of oppositely aligned attachment channels being perpendicular to the movable piece dowel pin drilling guide holes
c. the first pair of oppositely aligned attachment channels being locatable below a first horizontal plane,
XV. the movable piece having a second pair of oppositely aligned attachment channels,
a. the second pair of oppositely aligned attachment channels being perpendicular to the movable piece dowel pin drilling guide holes
b. the second pair of oppositely aligned attachment channels being parallel to the first pair of oppositely aligned attachment channels,
c. the second pair of oppositely aligned attachment channels being locatable above the first horizontal plane,
XVI. the movable piece being pivotably attached to the stable piece by means for pivotal attachment,
a. the means for pivotal attachment passing through the attachment channels and engaging the stable piece first retention passages.
C. a first rotatable end stop bar,
I. the first rotatable end stop bar having a bar passage passing completely therethrough,
II. the first rotatable end stop bar being rotatably attached to the stable piece by a rotatable attachment means,
a. the rotatable attachment means passing through the bar passage and engaging one of the pair of oppositely aligned end stop bar retention holes,
D. a second rotatable end stop bar,
I. the second rotatable end stop bar having a bar passage passing completely therethrough,
II. the second rotatable end stop bar being rotatably attached to the stable piece by the rotatable attachment means,
a. the rotatable attachment means passing through the bar passage and engaging one of the pair of oppositely aligned end stop bar retention holes.

4. A dowel pin drill guide lateral offset means comprising;
A. a stop pin hole,
I. the stop pin hole passing into a dowel pin drill stable piece,
a. the stop pin hole having a stop pin hole axis, the stop pin hole axis being perpendicular to a first dowel pin drill guide passage,
B. a stop pin,
I. the stop pin having a cylindrical stop pin stem,
a. the stop pin stem having a radius groove and an "o" ring seated in the radius groove for easy removal and relocation of the stop pin, the the relocation of the stop pin permitting the drilling of dowel pin guide holes laterally offset from one another,
II. the stop pin having a cylindrical stop pin head attached to the stop pin stem, and being co-axial with the stop pin stem,
III. the stop pin stem having a diameter less than a diameter of the stop pin hole such that the stop pin stem may be snugly inserted within the stop pin hole.

5. The dowel pin drilling guide according to claim 1 further comprising:
A. a first rotatable end stop bar,
I. the first rotatable end stop bar having a bar passage passing completely therethrough,
II. the first rotatable end stop bar being rotatably attached to the stable piece by a rotatable attachment means,
a. the rotatable attachment means passing through the bar passage and engaging one of the pair of oppositely aligned end stop bar retention holes,
B. a second rotatable end stop bar,
I. the second rotatable end stop bar having a bar passage passing completely therethrough,
II. the second rotatable end stop bar being rotatably attached to the stable piece by the rotatable attachment means,
a. the rotatable attachment means passing through the bar passage and engaging one of the pair of oppositely aligned end stop bar retention holes.

6. An Adjustable Dowel Pin Hole Drilling Guide comprising;
A. a stable piece,
I. the stable piece having a pair of oppositely aligned first retention passages,
B. a moveable piece,
I. the movable piece having a plurality of dowel pin drilling guide holes,
a. the dowel pin drilling guide holes being perpendicular to the stable piece dowel pin drilling guide hole,
II. the movable piece having a pair of oppositely aligned attachment channels,
a. the oppositely aligned attachment channels being co-axial with the stable piece oppositely aligned first retention passages,
b. the oppositely aligned attachment channels being perpendicular to the movable piece dowel pin drilling guide holes and perpendicular to the stable piece dowel pin drilling guide hole,
III. the movable piece being pivotably attached to the stable piece by means for pivotal attachment,
a. the means for pivotal attachment passing through the attachment channels and engaging the stable piece first retention passages,
C. a dowel pin drill guide lateral offset means,
I. the dowel pin drill guide lateral offset means having a stop pin hole,
a. the stop pin hole passing into the stable piece,
i. the stop pin hole having a stop pin hole axis, the stop pin hole axis being perpendicular to the movable piece dowel pin drilling guide holes,
II. the dowel pin drill guide lateral offset means having a stop pin,
a. the stop pin having a cylindrical stop pin stem,
b. the stop pin having a cylindrical stop pin head attached to the stop pin stem, and being co-axial with the stop pin stem,
c. the stop pin stem having a diameter less than a diameter of the stop pin hole such that the stop pin stem may be snugly inserted within the stop pin hole.

\* \* \* \* \*